July 29, 1930.   A. F. CARLSON   1,771,670
BUTTONHOLE SEWING MACHINE
Filed Jan. 6, 1926   17 Sheets-Sheet 1

Inventor.
Axel F. Carlson
by Heard Smith & Tennant.
Attys.

July 29, 1930.  A. F. CARLSON  1,771,670
BUTTONHOLE SEWING MACHINE
Filed Jan. 6, 1926   17 Sheets-Sheet 2

Inventor.
Axel F. Carlson
by Heard Smith & Tennant
Attys

July 29, 1930.  A. F. CARLSON  1,771,670
BUTTONHOLE SEWING MACHINE
Filed Jan. 6, 1926   17 Sheets-Sheet 3
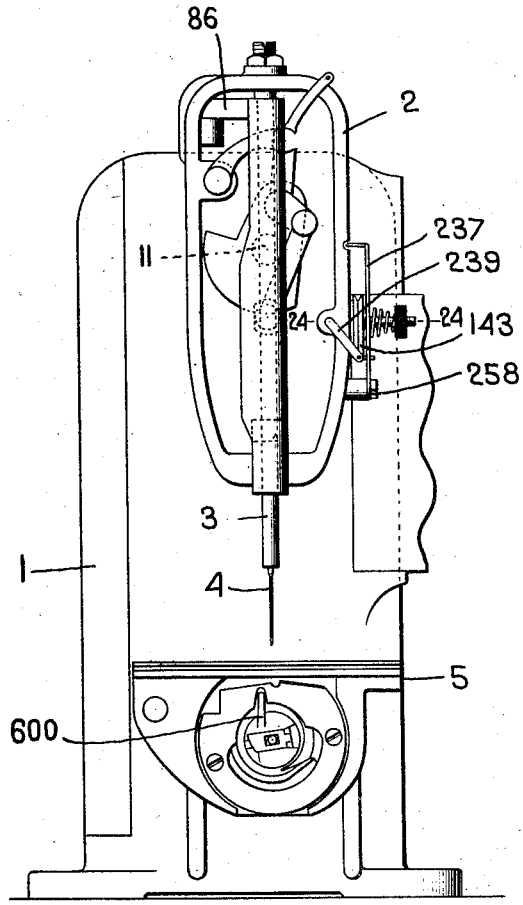
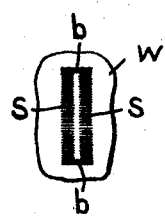
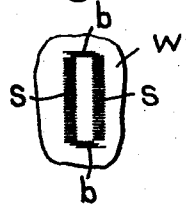
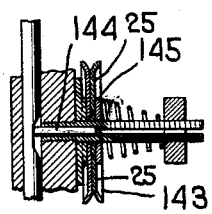
Inventor.
Axel F. Carlson
by Heard Smith & Tennant.
Attys.

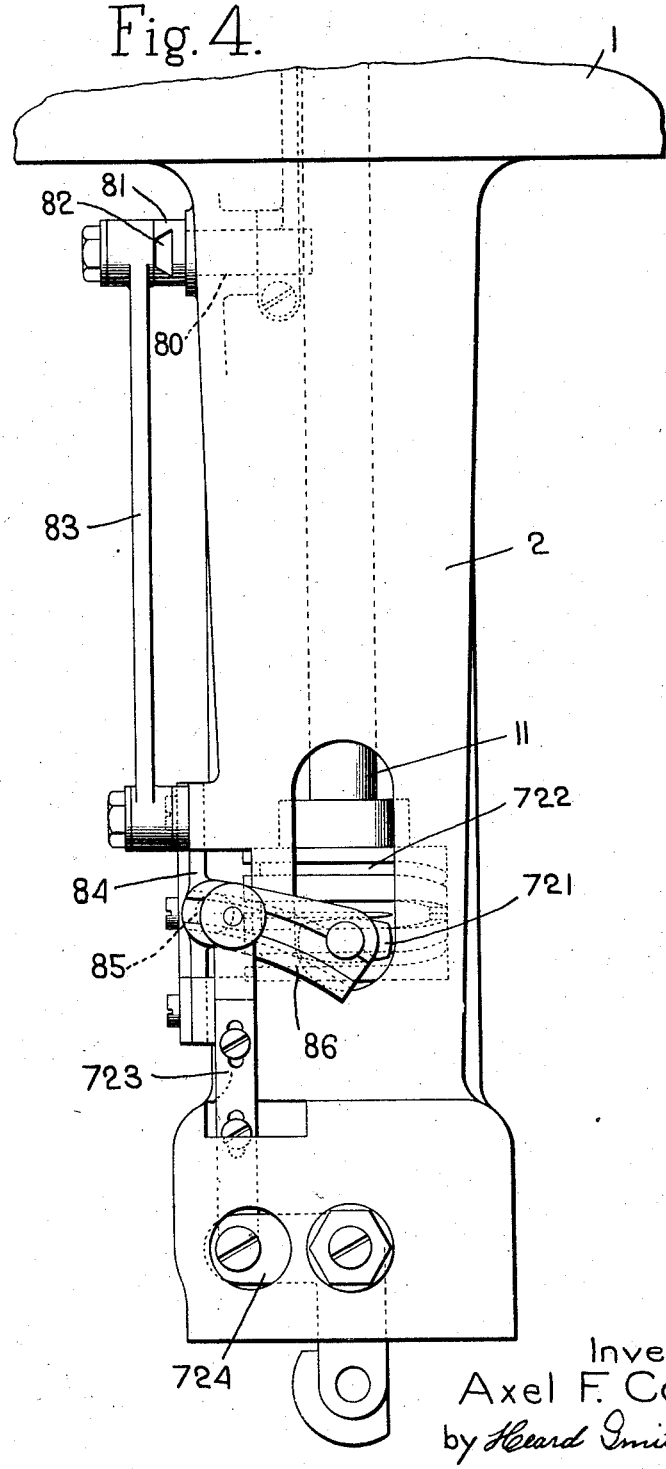

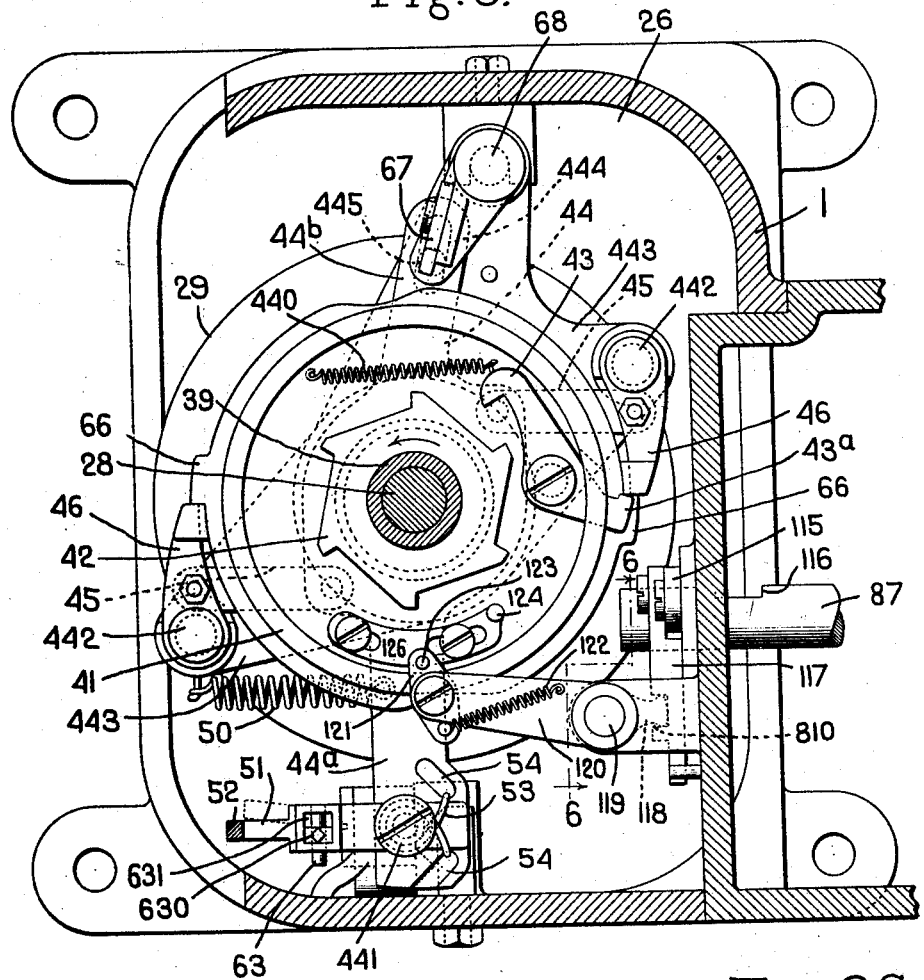
Fig.5.
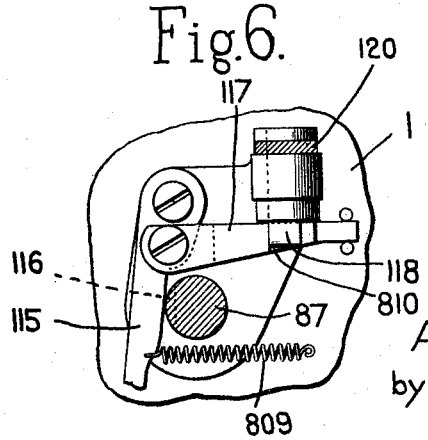
Fig.6.
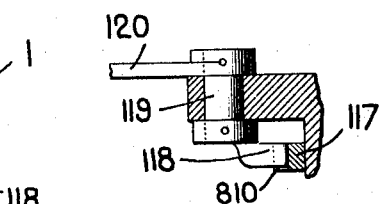
Fig.6ᵃ
Inventor.
Axel F. Carlson
by Heard Smith & Tennant.
Attys.

July 29, 1930.  A. F. CARLSON  1,771,670
BUTTONHOLE SEWING MACHINE
Filed Jan. 6, 1926   17 Sheets-Sheet 7

Inventor.
Axel F. Carlson
by Heard Smith & Tennant.
Attys.

Inventor.
Axel F. Carlson
by Heard Smith & Tennant.
Attys.

July 29, 1930.  A. F. CARLSON  1,771,670
BUTTONHOLE SEWING MACHINE
Filed Jan. 6, 1926  17 Sheets-Sheet 9

Inventor.
Axel F. Carlson
by Heard Smith & Tennant.
Attys.

July 29, 1930.     A. F. CARLSON     1,771,670
BUTTONHOLE SEWING MACHINE
Filed Jan. 6, 1926     17 Sheets-Sheet 10
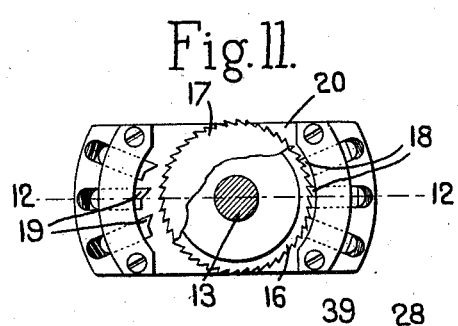
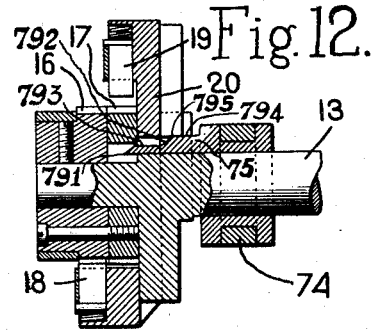
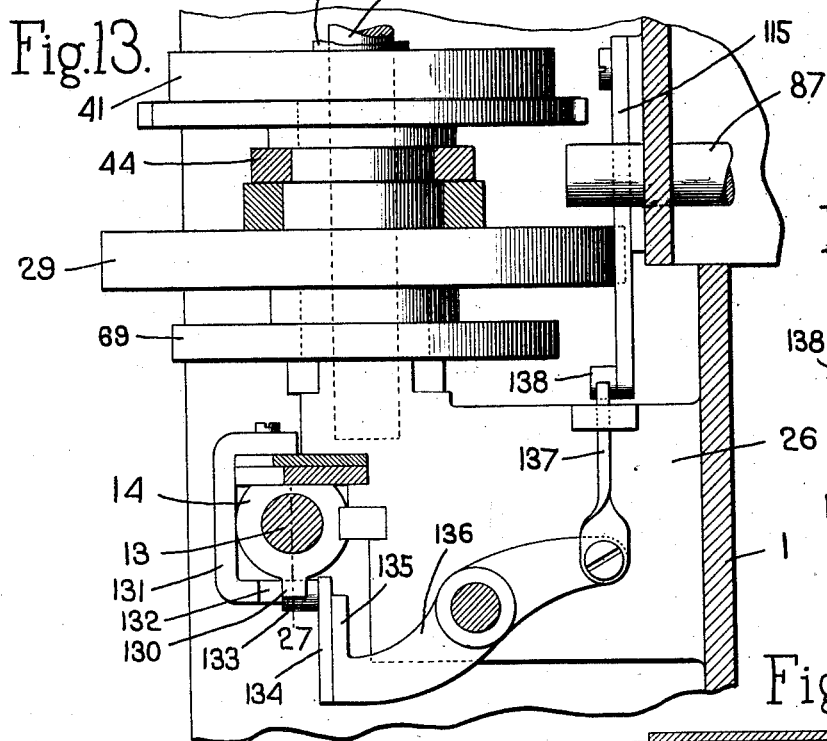
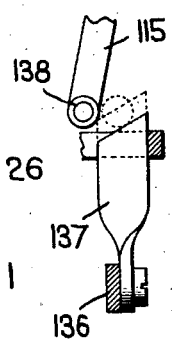
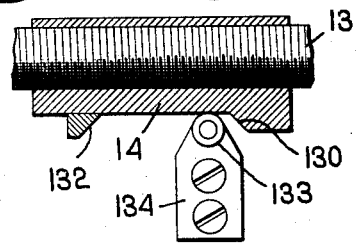
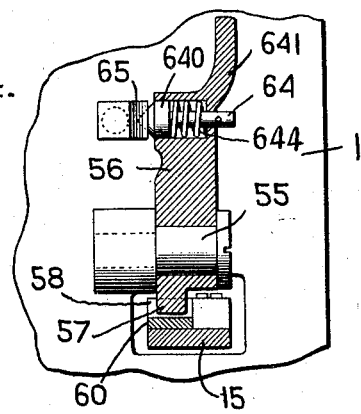
Inventor.
Axel F. Carlson
by Heard Smith & Tennant.
Attys.

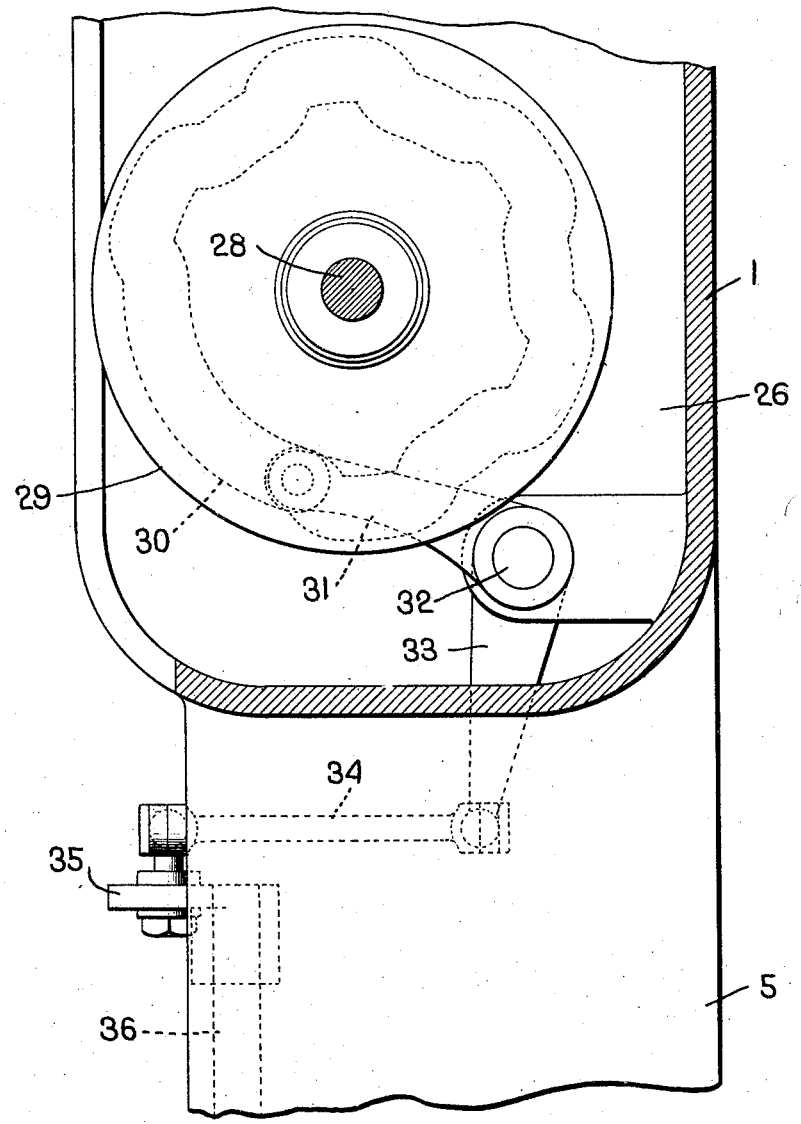

July 29, 1930.  A. F. CARLSON  1,771,670
BUTTONHOLE SEWING MACHINE
Filed Jan. 6, 1926   17 Sheets-Sheet 12

Inventor.
Axel F. Carlson
by Heard Smith & Tennant.
Attys.

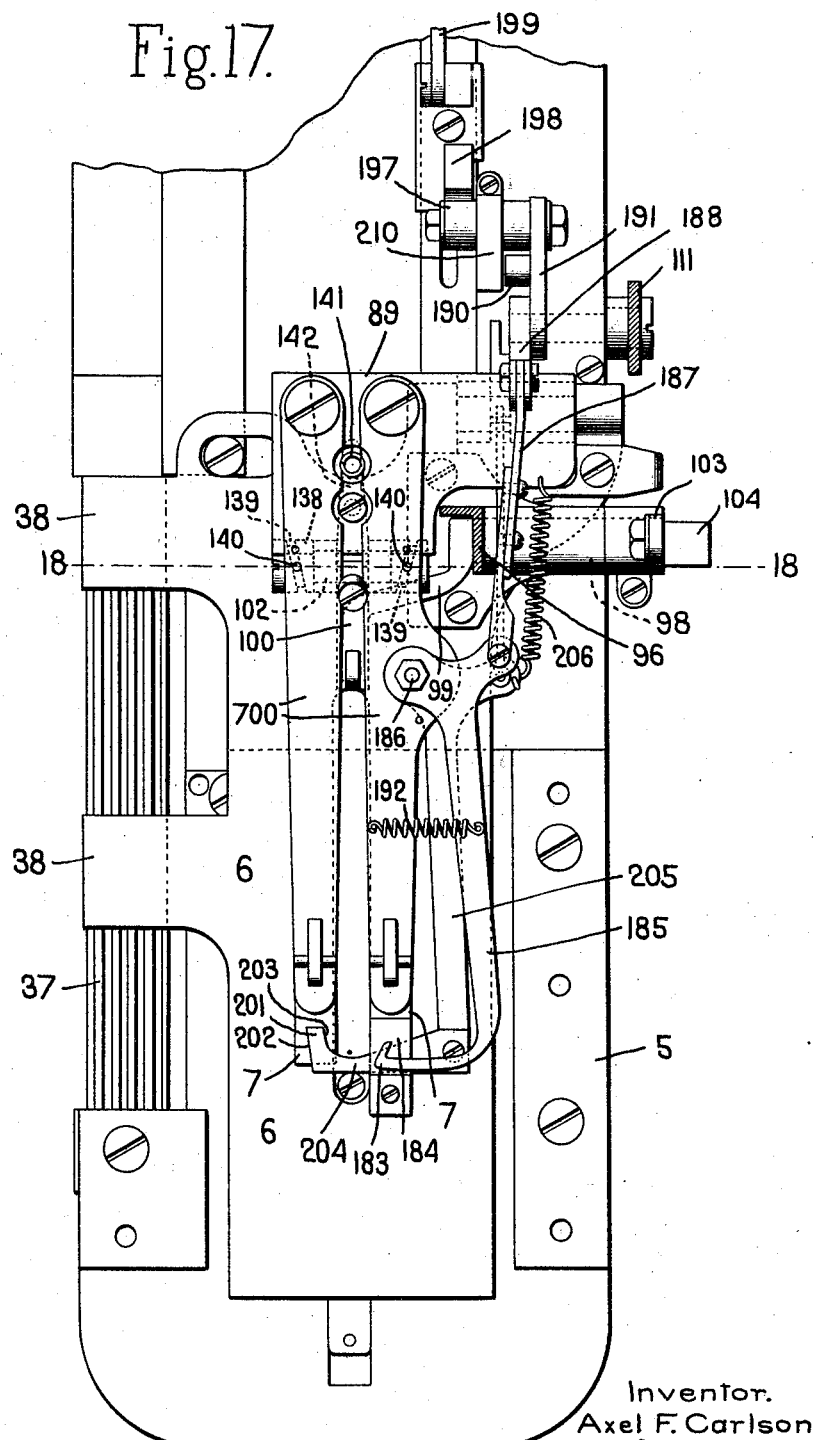

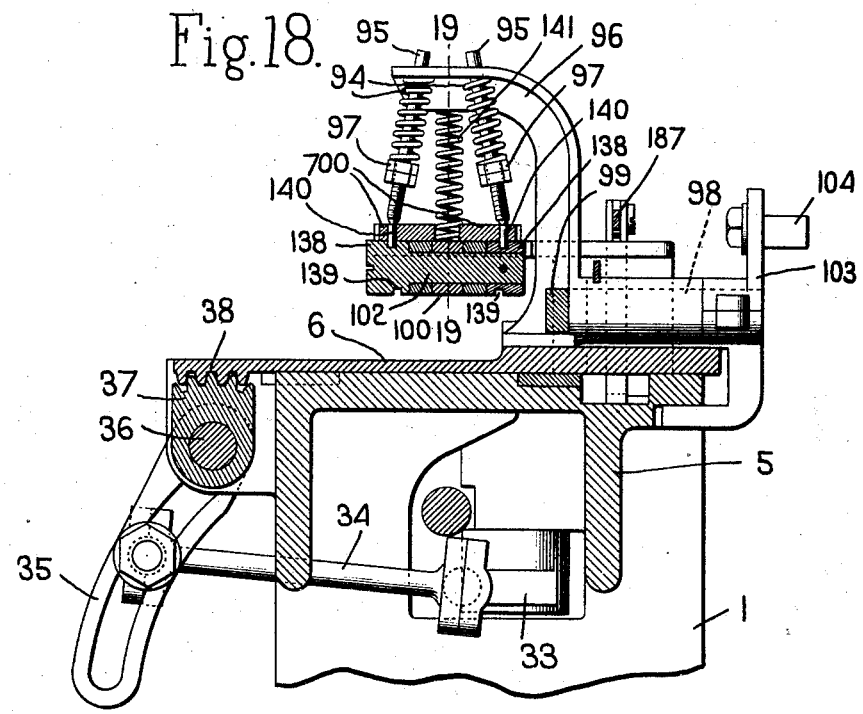
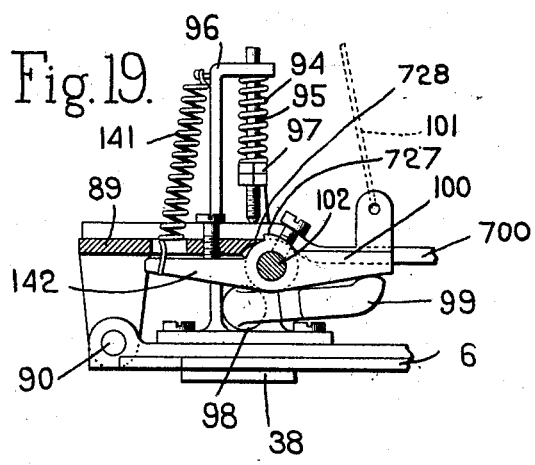

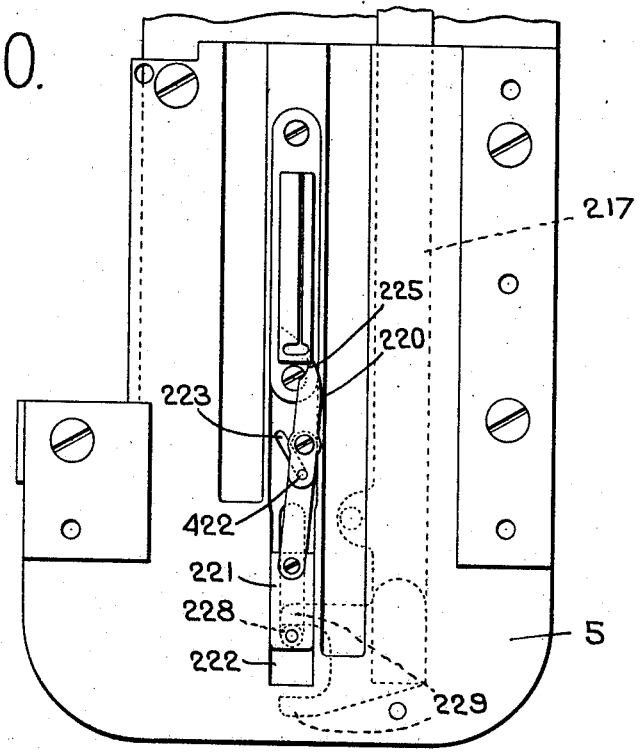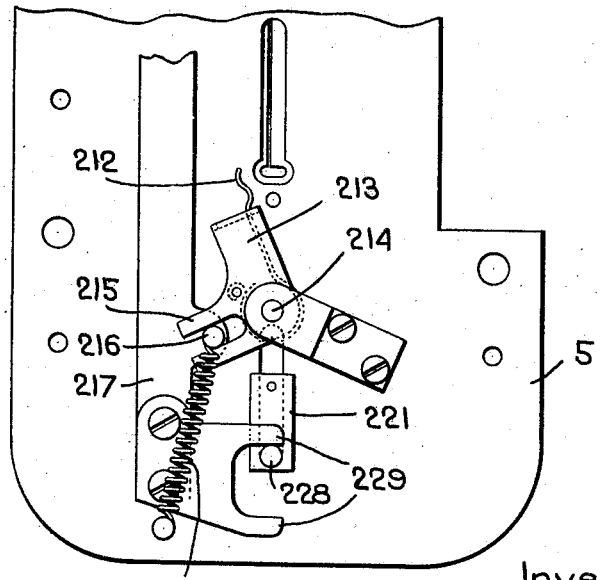

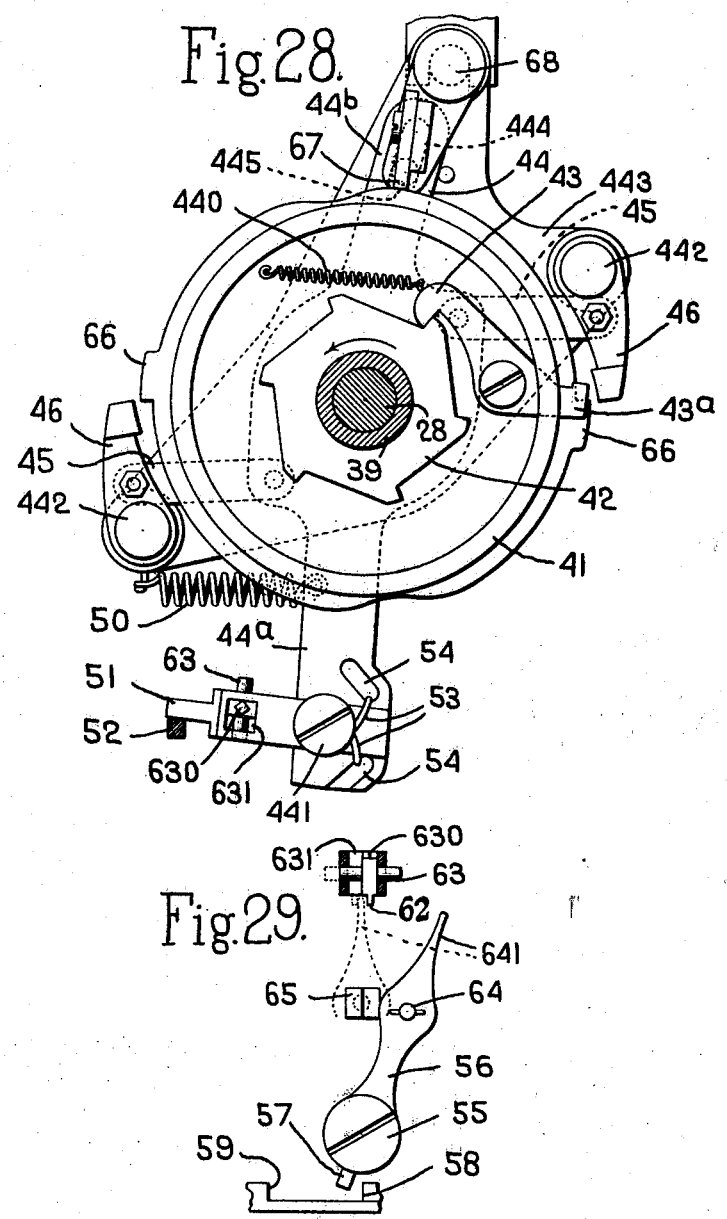

July 29, 1930.  A. F. CARLSON  1,771,670
BUTTONHOLE SEWING MACHINE
Filed Jan. 6, 1926  17 Sheets-Sheet 17

Inventor.
Axel F. Carlson
by Heard Smith & Tennant.
Attys.

Patented July 29, 1930

1,771,670

UNITED STATES PATENT OFFICE

AXEL FOLKE CARLSON, OF CAMBRIDGE, MASSACHUSETTS, ASSIGNOR TO THE REECE BUTTON HOLE MACHINE COMPANY, OF BOSTON, MASSACHUSETTS, A CORPORATION OF MAINE

BUTTONHOLE-SEWING MACHINE

Application filed January 6, 1926. Serial No. 79,523.

This invention relates to buttonhole sewing machines and especially to so-called "straight" buttonhole sewing machines which sew a straight buttonhole with a bar at each end.

Among the objects of my invention are to provide an improved sewing machine in which the controlling cam and operative parts are located on a vertical shaft placed in the back of the frame where they are readily accessible from the side of the machine; to provide an improved barring mechanism which is relatively simple in operation; to provide novel means for adjusting the relative spacing of the side stitches on the buttonhole; and to otherwise improve buttonhole sewing machines of this type, all as will be more fully hereinafter set forth.

In order to give an understanding of the invention I have illustrated in the drawings a selected embodiment thereof which will now be described after which the novel features will be pointed out in the appended claims.

Fig. 3 is a front view with the work clamp and associated parts omitted;

Fig. 4 is a top plan view of the overhanging arm;

Fig. 5 is a section on substantially the line 5—5, Fig. 1;

Fig. 6 is a section on the line 6—6, Fig. 5;

Figure 1:
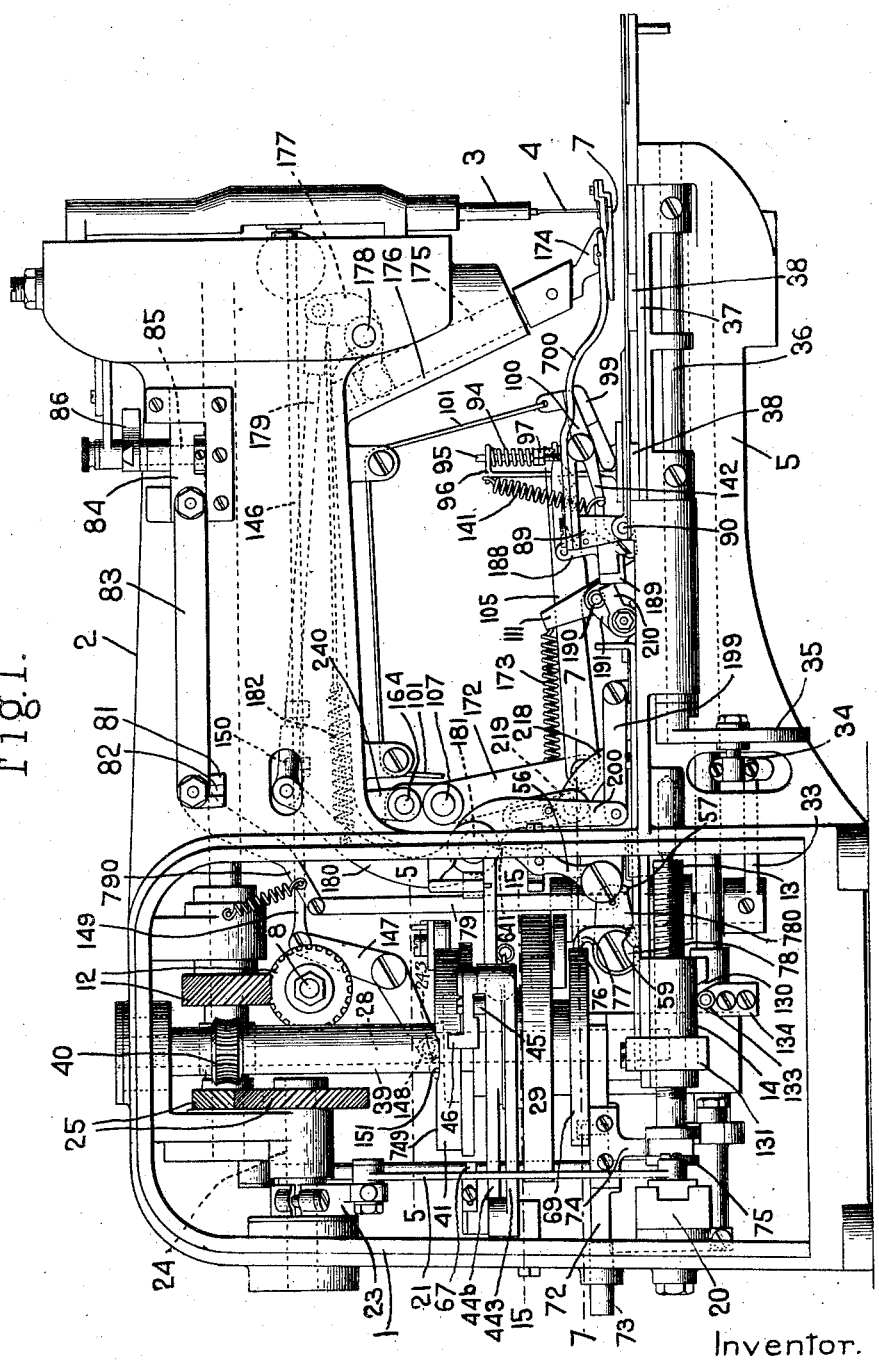
Fig. 1 is a side elevation of a sewing machine embodying my invention with the cover removed to better show the operative parts.
Figure 7:
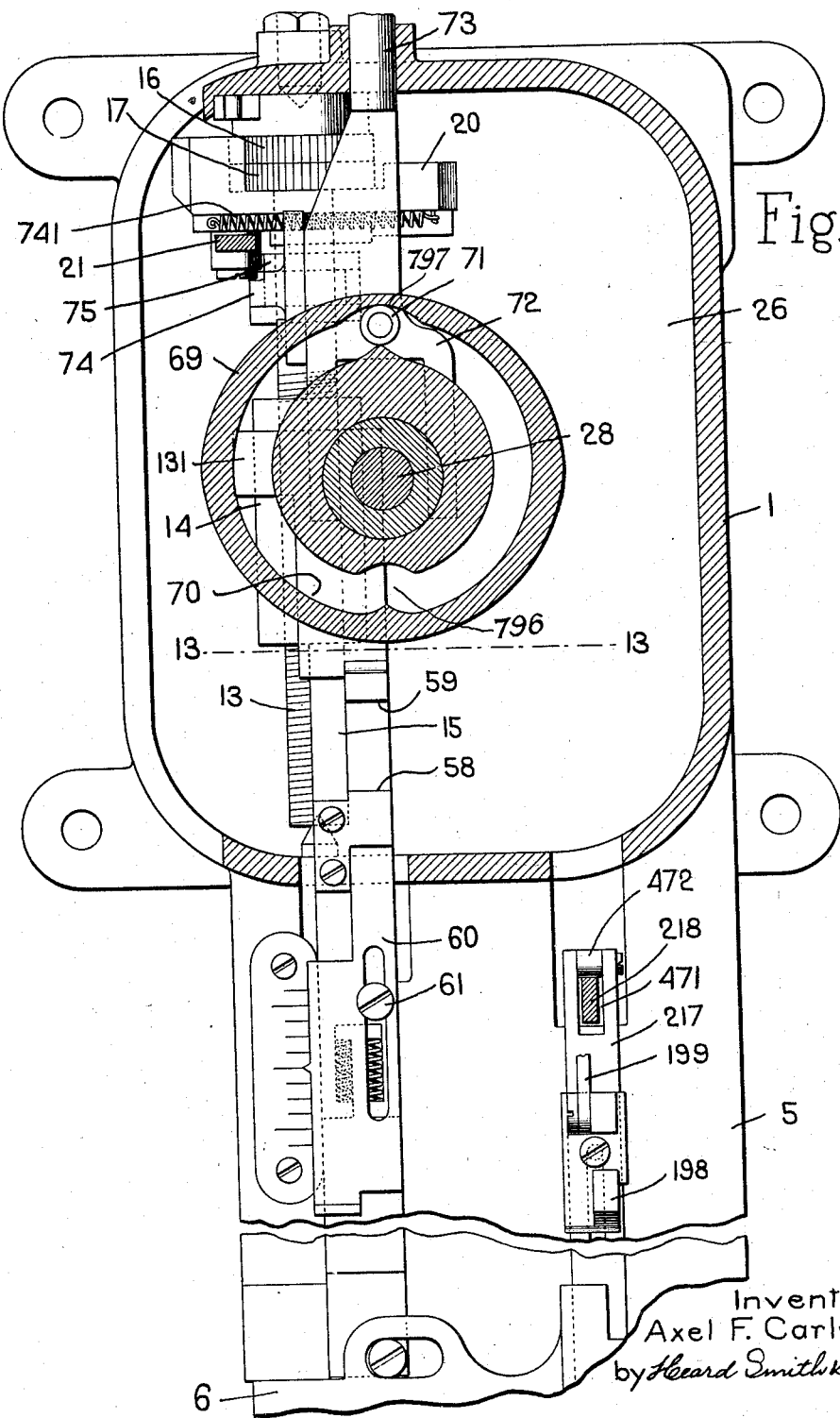
Figure 8:
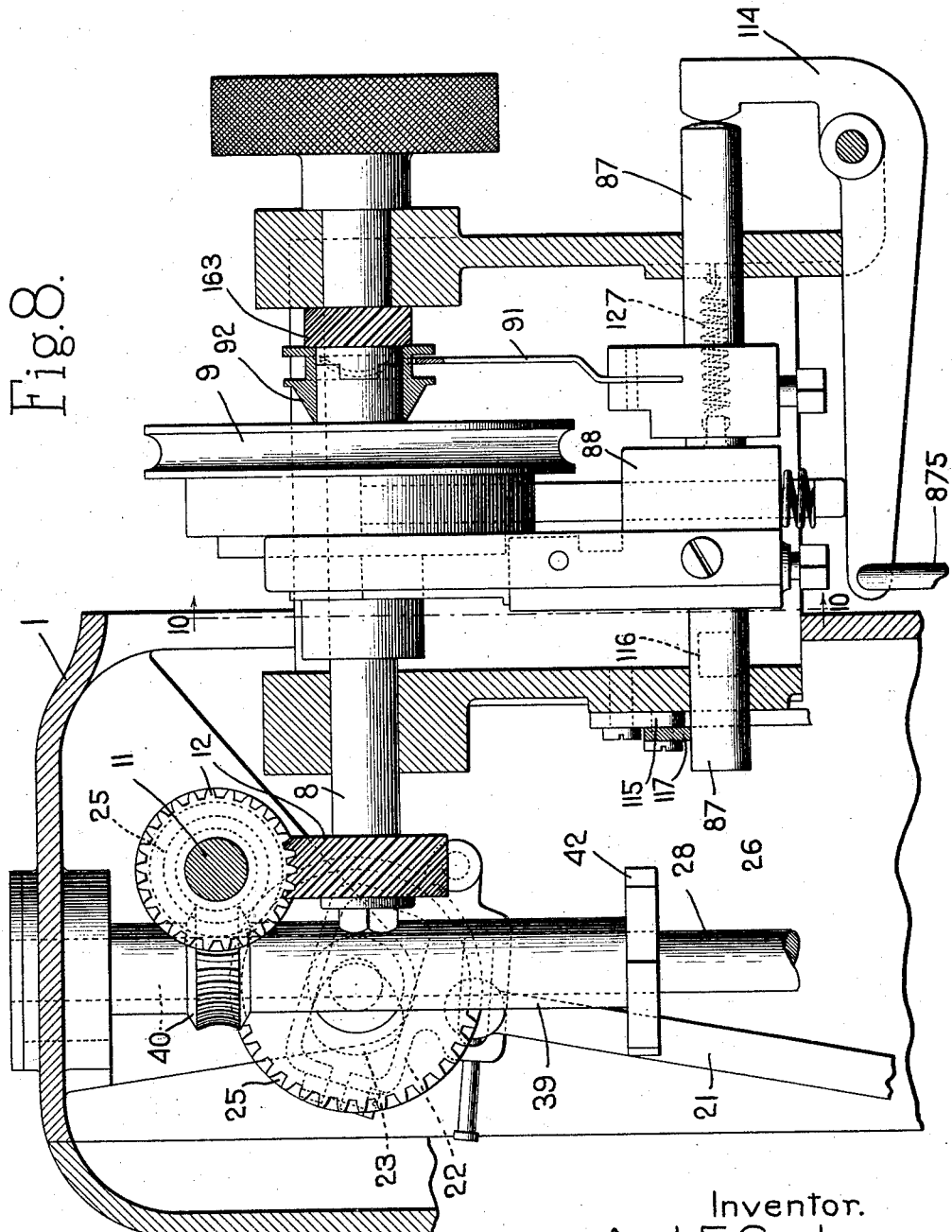
Figure 9:
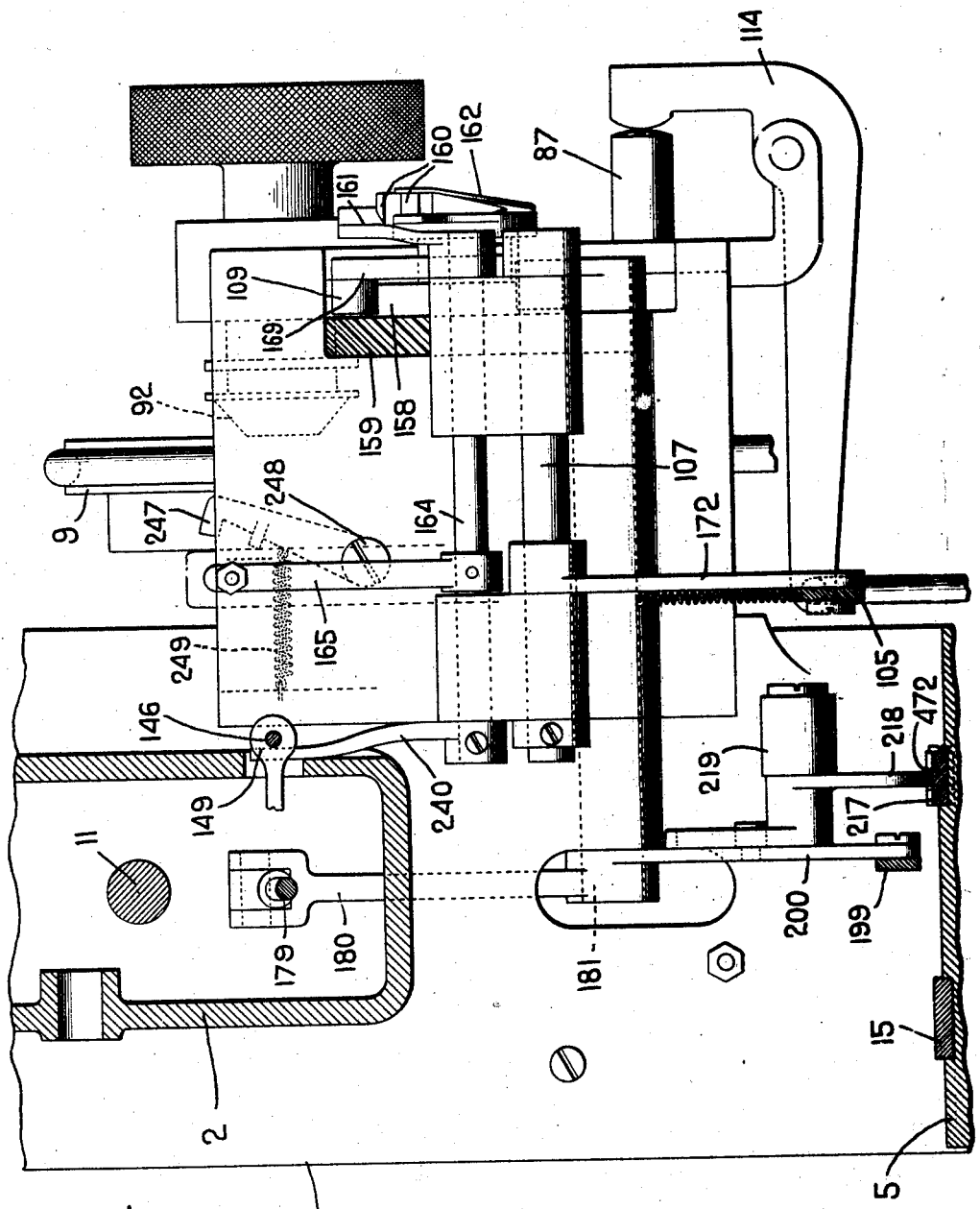
Figure 10:
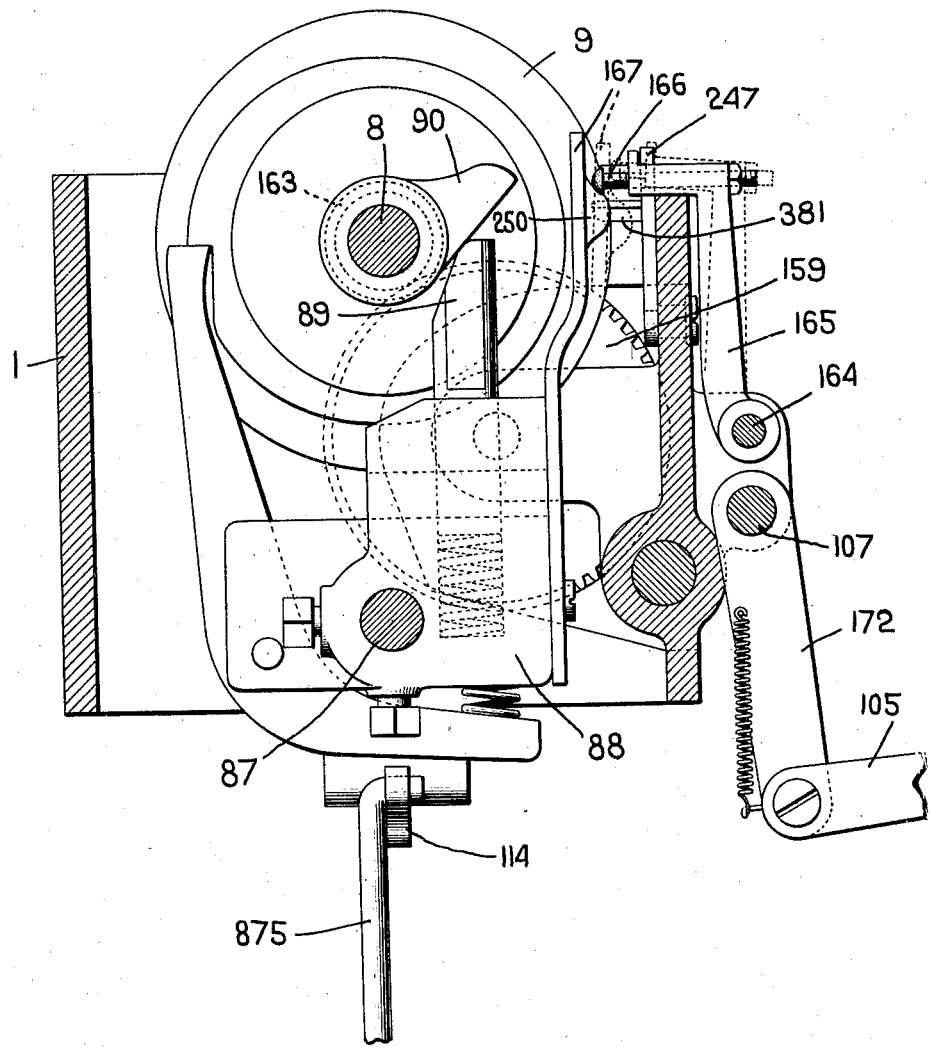
Figure 16:
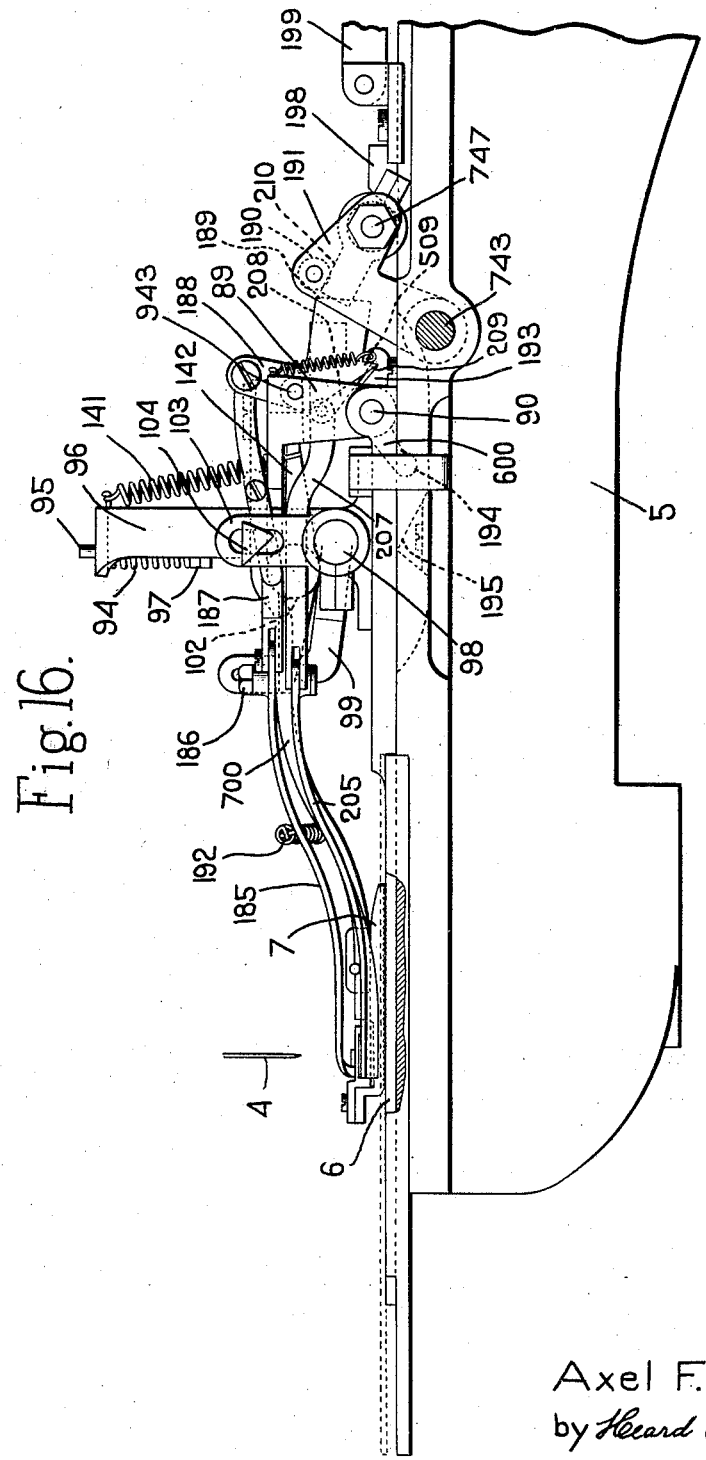
Figure 30:
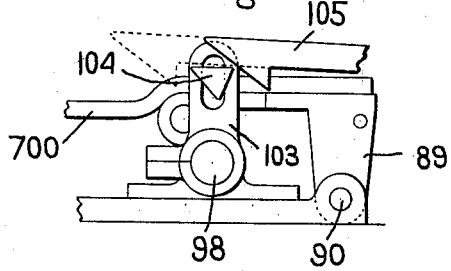
Figure 31:
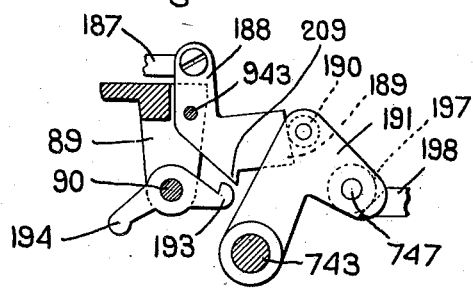
Figure 32:
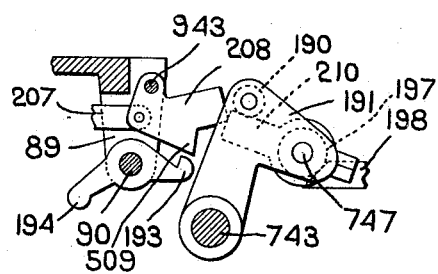
Figure 33:
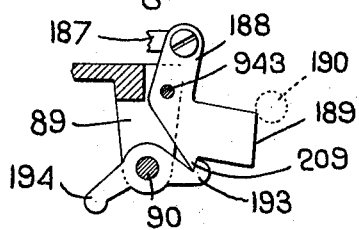
Figure 34:
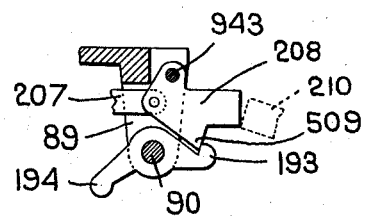
Figure 35:
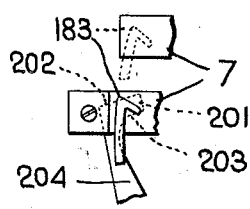
Figure 36:
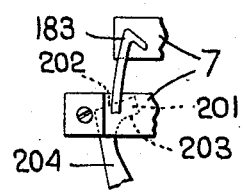

Fig. 6ª is a detail of the means for releasing the latch 115;

Fig. 7 is a section on the line 7—7, Fig. 1;
Fig. 8 is a section on the line 8—8, Fig. 2;
Fig. 9 is a section on the line 9—9, Fig. 2;
Fig. 10 is a section on the line 10—10, Fig. 8;

Fig. 11 is a fragmentary sectional view of the feed pawls for operating the feed shaft;

Fig. 12 is a section on the line 12—12, Fig. 11;

Fig. 13 is a fragmentary section on substantially the line 13—13, Fig. 7;

Fig. 14 is a sectional view showing the oscillating member which controls the barring operation;

Fig. 15 is a section on substantially the line 15—15, Fig. 1;

Fig. 16 is a side view showing the work clamps and the upper thread cutter with their operating mechanism;

Fig. 17 is a top plan view of the part shown in Fig. 16;

Fig. 18 is a section on the line 18—18, Fig. 17;

Fig. 19 is a section on the line 19—19, Fig. 18;

Fig. 20 is a plan view of the bed with the work plate removed to show the under cutting mechanism;

Fig. 21 is an under side view of the bed illustrating the under thread pull off;

Figs. 22 and 23 illustrate different forms of buttonholes which may be made on this machine;

Fig. 24 is a section on the line 24—24, Fig. 3;

Fig. 25 is a section on the line 25—25, Fig. 24;

Fig. 26 is a fragmentary detail view showing the way in which the member 137 operates to disengage the locking latch 115;

Fig. 27 is a section on the line 27, Fig. 13;

Fig. 28 is a view similar to Fig. 5 illustrating the driving member in operative driving position;

Fig. 29 is a fragmentary detail view of the latch-releasing member 56;

Fig. 30 is a view illustrating the manner in which the latch 104 operates to raise the clamps;

Fig. 31 is a fragmentary view showing the power-actuated means for operating the thread holder;

Fig. 32 shows the power-actuated means for operating the thread cutter;

Figs. 33 and 34 are fragmentary views showing the members 188 and 208 operatively engaged by the latch 193;

Figs. 35 and 36 are views illustrating the operation of the thread holder and cutter.

1 indicates the frame of the machine which has the usual overhanging arm 2 and in the end of which is reciprocably mounted the usual needle bar 3 carrying the upper needle 4. The machine frame is also provided with the usual work-supporting arm 5 on which the work $w$ is supported. During the sewing operation the work $w$ is held in a work holder comprising the usual under and upper work clamps 6 and 7. The sewing is accomplished by the co-operation of the upper needle 4 and an oscillatory hook which takes the loops of needle thread and casts them around the shuttle in a well known way.

The operative mechanism is driven from the power shaft 8, the latter being operated from a constantly-rotating driving pulley 9 which is clutched to the shaft through a clutch of any usual construction. This driving shaft 8 is geared to the shaft 11 which operates the needle bar by means of spiral gears 12.

The buttonhole which is sewed on the machine of this application is of the usual "straight" types, as shown in Figs. 22 and 23. This buttonhole is formed by the side stitches $s$ which extend along each side of the buttonhole slit and the barring stitches $b$ which extend across the ends of the buttonhole. During the formation of the side stitches $s$ the work-holding means is fed forwardly and during the formation of the barring stitches $b$ the work holder is reciprocated laterally.

The feeding movement of the work-holding means for feeding the work during the sewing of the side stitches $s$ on a buttonhole is of the type illustrated in Patents No. 749,776, January 19, 1904 and No. 800,798, October 3, 1905, and it comprises a feed screw 13 having screw-threaded engagement with a nut 14 which is connected to the work-holding means through the shank or connection 15. This feed screw is rotated first in one direction and then in the other thereby to move the work-holding means back and forth for formation of the edge stitches on the buttonhole.

The rotary movement of the feed screw is derived from a pawl-and-ratchet mechanism similar to that illustrated in above-mentioned Patent No. 800,798 and it comprises two ratchets 16, 17 fast on the screw shaft and co-operating with two sets of pawls 18 and 19, one for each ratchet, see Figs. 11 and 12. These pawls are carried in an oscillatory pawl carrier 20 which is connected by a link 21 to a yoke 22 of a three-cornered cam 23 on a shaft 24 which is geared to the shaft 11 by spiral gearing 25.

The parts thus far described are substantially the same as would be found in the above-mentioned patents.

One feature of my present invention relates to a novel arrangement by which the cams which control the barring operation are situated in a chamber 26 formed in the main frame rather than being situated beneath the bed. The frame is provided with a removable cover 27 which when removed gives access to the operative parts. These operative parts are supported on a stationary shaft or support 28.

The barring stitches are formed by giving the work clamps a lateral movement and this movement is derived from a barring cam 29, see Figs. 1, 5 and 15, which is loosely mounted on the stud 28 and which is normally idle but is rotated at the proper time in the cycle of operations. The barring cam has a cam groove 30 in which is received a roll on the end of an arm 31 fast on a rock shaft 32, said rock shaft carrying at its lower end another arm 33 which is connected by a link 34 to a slotted arm 35 on a rock shaft 36 that is journalled in the work-supporting arm 5. This rock shaft 36 has fast thereon an elongated gear sector 37, the teeth of which engage teeth in arms 38 extending from the under work clamps 6. The purpose of having the elongated gear is to ensure that an operative connection will be maintained between the work clamp and the gear sector during the back and forth movement of the work clamps while the side stitches are being formed.

The barring cam 29 is driven from a sleeve 39 which is rotatable on the shaft 28 and is geared to the shaft 11 by means of worm gearing 40. This sleeve 39 is thus constantly rotating while the machine is in operation.

The barring cam 29 has rigid therewith a driving member 41 which is normally disconnected from the sleeve 39 but is connected thereto at the proper time when the barring stitches are to be formed. The sleeve 39 has rigid therewith a driving ratchet 42 and the driving member 41 has pivoted thereon a driving pawl 43. This pawl is acted on by a spring 440 tending to swing it into driving engagement with the ratchet but during the formation of the side stitches on the buttonhole this pawl is held out of engagement with the ratchet by the following means.

Situated between the driving member 41 (see Figs. 1 and 5) and the barring cam 29 is a lever or controlling member 44 which is adapted to swing slightly about the axis of the shaft. This member 44 has two links 45 connected thereto which are connected to two stop pawls 46 that are pivoted at 442 to a stationary plate 443.

The driving pawl 43 is provided with a tail $43^a$ which is adapted to engage one or the other of the stop pawls 46 and during the sewing of the side stitches on the buttonhole the tail $43^a$ is in engagement with one of the stop pawls 46 as shown in Fig. 5 and thus is held in inoperative position.

When the sewing on either side of the buttonhole is completed then the member 44 is turned into the position shown in Fig. 28 thereby to disengage the stop pawl 46 from the tail of the driving pawl 43 and the latter will then drop into driving engagement with the driving ratchet 42 through the action of the spring 440. This shifting of the controlling member 44 is controlled by the to-and-fro movement of the work holder, said member being shifted into the position shown in Fig. 28 at each end of the buttonhole.

The controlling member 44 is acted on by a spring 50 which tends to swing it into the position shown in Fig. 28 and during the sewing at the side of the buttonhole this control member is held in the position shown in Fig. 5 by means of a latch 51 which is adapted to engage a fixed stop arm 52. This latch is pivoted at 441 to the arm 44ª of the controlling member 44 and it is normally held by a spring 53 in its central position, in which position it engages the stop 52. The spring 53 is a U-shaped spring which straddles the rear end of the latch and the arms of which depend into slots 54 formed in the portion 44ª of the controlling member. When the latch is swung about its pivot 441 in either direction the spring 53 is flexed or placed under tension and the resiliency of the spring will tend normally to swing the member 51 back into its central position again.

Means are provided whereby when the side stitching s on each side of the buttonhole has been completed the latch 51 will be automatically shifted laterally out of engagement with the stop 52 and when this occurs the spring 50 will swing the controlling member 44 about the shaft 28 into the position shown in Fig. 28 thus releasing the driving pawl 43 as above described so that the latter will engage the driving ratchet 42 and thus set the barring cam in operation. The barring cam makes a half revolution during each barring operation at the end of which time the controlling member is restored to the position shown in Fig. 5.

For thus releasing the latch 51 a latch-releasing member 56 is provided (see Figs. 14 and 29) which is pivoted to the frame at 55 and which is provided with a tail 57 which is situated between two shoulders 58 and 59 on the shank 15 of the work clamps. When during the feeding movement of the work clamps for the side stitching operation one of the shoulders 58 or 59 engages the tail 57, the latch-releasing member 56 will be swung about its pivot and the upper end will engage the latch 51 and swing it about its pivot thus disengaging it from the stop 52. When this occurs the spring 50 will swing the controlling member into the position shown in Fig. 28 as above described. The shoulder 58 engages the tail 57 at one end of the buttonhole and thereby swings the latch in one direction to release it from the stop and the other shoulder 59 engages the tail at the other end of the buttonhole and swings the member 56 in the opposite direction thereby to release it from the stop.

The length of the buttonhole depends upon the distance between the shoulders 58 and 59. To provide for adjusting the length of the buttonhole the shoulder 58 is made adjustable relative to the shoulder 59. This adjustment is provided for by forming said shoulder on a slide 60 which is slidable on the shank 15 and is held in adjusted position by a set screw 61.

The mechanism for releasing the latch 51 is constructed so that the latch will be released with a sort of snap action. The latch 51 carries a pin 63 which is slidable transversely thereof, the sliding movement of the pin being limited by a collar 630 which is fast to the pin and is received in an opening 631 in said latch. This pin carries on its under side a lug 62 with which the upper end 641 of the latch-releasing member 56 engages and, therefore, when the latch-releasing member is turned it will first engage the lug 62 and move the pin to the limit of its movement and then further swinging movement of the member 56 will give movement to the latch.

The latch-releasing member 56 carries a pin 64 which is acted on by a spring 644 and which has a pointed head 640 (see Fig. 14) which wipes by a stationary cam 65 during the swinging movement of the member 56. The cam is so situated that the head of the pin wipes by the point of the cam when the member 56 is in its central position. Whenever the head of the pin does wipe by the point of the cam during the turning movement of the cam-releasing member 56 the action of the spring 644 will result in giving the member 56 a quick forward movement or a sort of snap action which will result in giving the latch 51 a quick releasing movement.

The sequence of operations of these parts is as follows. Whenever one of the shoulders 58 or 59 engages the tail 57 the member 56 will be gradually swung from one extreme position toward the other and as it approaches the central position the upper end will engage the lug 62 and will slide the pin 63 transversely of the latch. This movement is being given to the pin just while the head 640 of the spring-pressed pin 64 is wiping by the cam 65 and just after the head 640 of the pin has passed the cam and the member 56 is given its quick snap action the pin 63 will have reached the limit of its movement so that the snap or quick action will be delivered to the latch 51. By reason of this construction the release of the latch 51 will always be ensured notwithstanding the slow movement of the work clamps.

As stated above the mechanism for driving the barring cam gives said cam a half rotation during the formation of the barring stitches b at each end of the buttonhole and at the end of the barring stitches the barring operation is brought to rest by the disengagement of the driving pawl 43 from the driving ratchet 42. This is accomplished by restoring the controlling member 44 from the position shown in Fig. 28 to that shown in Fig. 5, in which position one of the pawls 46 is so placed as to engage the tail 43ᵃ of the driving pawl 43 and thereby disengaging the driving pawl from the driving ratchet. This restoring of the member 44 is accomplished by the following means.

The member 41 has formed thereon two oppositely-disposed lugs 66. 67 is a restoring arm pivoted at 68 to the frame and having a pin-and-slot connection with the extension 44ᵇ of the controlling member 44, said extension having a slot 445 therein in which operates a pin 444 depending from the arm 67. By virtue of this pin-and-slot connection the controlling member 44 and the arm 67 are compelled to swing simultaneously. When the parts are in the position shown in Fig. 28 the end of the pawl 67 is in the path of movement of the lug 66 and, therefore, as the barring cam 29 and the driving member 41 make their half rotation for the formation of either set of barring stitches $b$ one of the lugs will engage the latch 67 and swing the latter to the left Fig. 28 into the position shown in Fig. 5 thereby turning the controlling member 44 into the position shown in Fig. 5 against the action of the spring 50. This turning or restoring movement of the member 44 will operate through the links 45 to swing the pawls 46 inwardly into the position shown in Fig. 5 and will also swing the extension 44ᵃ backwardly into a position where the latch 51 will snap in behind the stop pawl 52. This restoring of the member 44 occurs when the barring cam has made about a quarter revolution or when the barring stitches are about half formed and the cam will then continue to rotate through another quarter revolution and at the end of the second quarter revolution or a half rotation the tail 43ᵃ of the pawl 43 will engage one of the stop pawls 46 thus disengaging the driving pawl from the driving ratchet 42 and at the instant this occurs the two lugs 66 abut against the stop pawls 46 thus bringing the barring cam positively to rest with the driving pawl disengaged from the ratchet as shown in Fig. 5.

During the time that the side stitches $s$ along the first side of the buttonhole are being formed the feed screw 13 is operated by one set of pawls, for instance the pawls 18, Fig. 11, which co-operate with the ratchet wheel 16. When the side stitches $s$ along the first side of the buttonhole have been completed the pawl carrier 20 is shifted to throw both sets of pawls out of engagement with their ratchet wheels thus stopping the actuation of the feed screw and when the barring stitches at the first end of the buttonhole have been completed the feed is reversed by shifting the pawl carrier 20 to bring the pawls 19 into oprative engagement with the ratchet 17, the teeth of which are oppositely disposed to those of the ratchet 16. This reversing of the pawl is accomplished by a cam member 69 (see Figs. 1 and 7), which cam member is rigid with the barring cam 29 and rotates therewith. This cam 69 has the closed cam groove 70 in which operates a roll 71 carried by a sliding yoke 72, the latter having an extension 73 which extends through the frame 1 and has a bearing therein. This yoke 72 has adjustably secured thereto a fork 74 which embraces the hub of the pawl-reversing cam member 75 (see Figs. 1 and 12). This cam member 75 is constructed similar to the corresponding cam member in Patent No. 800,798, in that it has two incline portions 791 and 792, the straight portion 793 between the incline portions and the high portion 794. This cam member co-operates with the heel portion 795 of the pawl carrier and also with a spring 741 to control the position of said pawl carrier. Said cam is shown in Fig. 12 in its projected position with the heel 795 resting on the high portion 794 of the cam and when in this position the pawls 18 will be in operative engagement with the ratchet wheel 16. When the cam member is partially withdrawn so that the heel 795 rests on the intermediate straight portion 793 the pawl carrier will be in an intermediate position with both sets of pawls 18 and 19 out of engagement with their ratchets. When the cam 75 is completely withdrawn so that the heel 795 rides down the incline 791 then the pawls 19 will be brought into operative engagement with the ratchet wheel 17.

The cam groove 70 is of the special shape shown in Fig. 7, it having two oppositely-disposed relatively abrupt cam portions 796 and 797 which are so situated that the roll occupies one or the other of these relatively abrupt portions when the barring cam is at rest during the formation of the side stitches $s$. When the roll 71 is in the position shown in Fig. 7 the cam 75 will be fully projected as shown in Fig. 12 thereby rendering the pawls 18 operative to feed the work.

When the edge stitches on the side of the buttonhole have been completed and the barring cam begins its turning movement the roll 71 passes out of the abrupt portion 797 into the portion of the groove connecting the two abrupt portions. As the cam roll passes out of the abrupt portion 797 it will give the cam 75 a sufficient retracting movement to allow the foot 795 to move down the incline 792 onto the flat face 793 so that during the half rotation which the barring cam and the cam 69 have as the barring stitches are being formed both sets of pawls 18 and 19 will be out of engagement with the ratchet wheels. When the barring cam has made its half revolution and the barring stitches have been completed the abrupt portion 796 will be brought into position to receive the roll 71 and this will give the cam 75 a further retracting movement to allow the foot 795 to ride down the incline 791 which will result in bringing the pawls 19 into operative engagement with their ratchet wheel 17. The feeding of the work then begins in the reverse direction at the same time that the side stitching operations begin.

When the stitching on the second side has been completed the barring cam is given another half revolution during which the same operation will be repeated but in reverse order and restoring the parts to the position shown in Figs. 7 and 12.

Means are provided whereby the distance between the two lines of side stitching s may be varied as required by the character of the goods in which the buttonhole is being formed and this is accomplished by means which gives the needle a lateral feeding movement in addition to the vibrating movement of the work holder during the formation of the barring stitches. For this purpose I have provided the following mechanism.

This reversing cam 69 is provided with a peripheral cam surface 76 which is engaged by a follower arm 77 on a rock shaft 78, the latter having an arm 780 fast thereon which is connected by a link 79 to an arm 790 on a rock shaft 80. This rock shaft 80 is provided with a slotted arm 81 in the slot of which is adjustably mounted a block 82 to which is pivotally connected one end of a link 83, the other end of said link being connected to a slide 84 which carries a rock shaft 85 having a slotted arm 86 that forms part of the usual needle jogging mechanism, and which is provided with a shoe 721 operating in the usual switch cam 722 carried by the shaft 11. The swinging of the arm 86 by the switch cam 722 operates through the link 723 to vibrate the angular frame 724 in which the needle bar is supported.

When the block 82 is adjusted off center of the rock shaft 80 then during each barring operation the cam surface 76 will operate through the connections above described to give the rock shaft 80 a slight turning movement and thereby give the slide 84 a feeding movement. This will result in producing overlapping barring stitches b as seen in Fig. 23 and will separate the two lines of stitches at each side of the buttonhole more or less depending on the adjustment of the block 82.

The clutch for connecting the driving pulley 9 to the power shaft 8 is controlled by a slidable clutch-controlling rod 87 which carries the stop motion block 88 provided with the usual stop dog 89 that co-operates with the stop cam 90. This clutch-controlling rod also has the usual forked arm 91 which controls the clutch-controlling cone 92 by which the clutch is thrown in operation. This type of clutch and stop motion is well known and, therefore, needs no further description.

The machine herein shown is so constructed that when it comes to rest the work clamps 7 are automatically raised and held in raised position. Furthermore, the machine is designed to be started by depressing the starting treadle and according to one feature of my invention the initial downward movement of the starting treadle will release the work clamps thus allowing them to automatically clamp the work and the final movement of the starting treadle will engage the clutch and thus start the stitch-forming mechanism in operation. The work clamps 7 are carried by arms 700 which are secured to a rocking member 89 pivoted at 90 to the rear end 600 of the under clamp member 6.

The clamps are yieldingly held closed by means of springs 94 which encircle pins 95 rising from the upper clamps, the upper end of said pins being guided in openings, formed in the upper end of an upstanding arm 96 which is rigid with the under clamping member 6. These springs engage the arm 96 at one end and engage adjustable collars 97 on the pins at their lower ends.

The clamps are normally held in their open position when the machine is at rest by means of the following construction. Mounted in bearings in the under clamp member is a rock shaft 98 having rigid therewith an offset crank 99 (see Figs. 16 and 17) which engages the under side of an arm 100 fast on a rock shaft 102 journalled in a bearing on the rocking member 89 (see Fig. 19). The head of the member 100 is provided with a shoulder 727 which co-operates with a shoulder 728 formed on the member 89. When the rock shaft 98 is turned to raise the arm 99 such upward movement of the arm 99 will turn the arm 100 and its rock shaft 102 anti-clockwise until the shoulder 727 engages the shoulder 728 after which further upward movement of the crank arm 99 will result in swinging the member 89 upwardly about its pivot 90 and thus raising the upper work clamps. The arm 100 has a flexible connection 101 secured thereto which passes over direction pulleys and extends to a treadle and by means of which the clamps may be manually opened if desired.

The work clamps are held open at the end of the buttonhole by means of a latch 105 which is adapted to engage a projection 104 extending from an arm 103 that is rigid with the rock shaft 98. The mechanism by which the latch is caused to engage the projection 104 and open the clamps at the end of the buttonhole will be presently described. This latch 105 is pivotally connected to the end of a lever 172 fast on a rock shaft 107 and which will be presently described. When the machine is first started the latch 105 is released from the projection 104 to allow the clamps to close by the action of the springs 94 and this release occurs through the following mechanism.

Pivoted to the bed frame is a swinging arm 111 carrying a pin 112 adapted to engage a cam surface 113 on the under side of the latch 105. This arm or lever 111 is connected by a link 114 to an elbow lever 115, the latter having a rod 820 depending therefrom which extends through a head 872 carried on the upper end of a connection 871 which leads to the starting treadle. The rod 820 has a collar 827 thereon with which the head 872 engages so that downward movement of the starting treadle will operate through the connections above described to swing the lever 111 into the dotted line position Fig. 2 thereby releasing the latch from the projection 104 and allowing the clamps to close. This same downward movement of the connection 871 also throws the clutch.

It will be remembered that the driving pulley 9 is connected to the power shaft 8 by the shifting of the stop motion carrier 87 and this shifting movement is accomplished by the elbow lever 114 which has a link 875 depending from it which also extends through the head 872 and is provided with a collar 876 thereon beneath the head. The collar 876 is so adjusted that the head will not engage the same until after said head has had its initial downward movement. As a result when the treadle is depressed the initial downward movement of the treadle releases the latch 105 from the projection 104 and allows the clamps to close and further downward movement operates the lever 114 and throws the clutch thereby starting the stitch-forming mechanism in operation. At the end of the buttonhole the stop motion brings the stitch-forming mechanism to rest and operates the latch 105 by mechanism which will be hereinafter described causing it to hook over the projection 104 and draw the latter backwardly to open the clamps.

When the stop motion carrier 87 is shifted toward the left Fig. 8 to throw the clutch into operation it will be automatically locked or latched in this position by means of a pivoted latch 115 which is acted on by a spring 809 and is adapted to drop into a notch 116 formed in the carrier 87.

Means are provided for automatically re-releasing the latch 115 at the end of the buttonhole at which time the spring 127 which is connected to the carrier 87 will shift the latter into the position shown in Fig. 8 thereby unclutching the pulley 9 from the power shaft and bringing the stop motion into operation in a well-known way.

The latch 115 has pivotally connected thereto a link 117 which is provided with a recess 810 in which is received the offset end of an arm 118 fast on a rock shaft (see Figs. 5, 6 and 6ᵃ). This rock shaft has another arm 120 fast thereon which has pivoted to its end a swinging arm 121 (see Fig. 5) that is acted on by a spring 122 and is provided with an upstanding pin 123.

This swinging member co-operates with a stopping pin 124 which is rigid with the driving member 41. This stopping pin is preferably adjustably secured to the driving member and for this purpose it is provided with a slotted foot 126 which is adjustably secured to the driving member by means of screws. The driving member 41 makes one complete revolution for each buttonhole and as it completes each revolution the stopping pin 124 engages the swinging member 121 and through the latter swings the arm 120 thereby turning the rock shaft 119 and through the arm 118 shifting the link 117 into a position to release the pawl 115 from the stop motion carrier as seen in Fig. 6. As soon as the pawl is thus released the spring 127, see Fig. 8, operates to restore the stop motion carrier to its normal position thereby disengaging the clutch and bringing the stop dog into the path of movement of the stop cam which will bring the machine to rest.

The machine herein shown is provided with an emergency stop device which operates to set the stop motion in action in case the feed should not reverse properly at the end of the buttonhole.

The feed nut 14 is provided with a cam surface 30 and the adjustable slide 60 has an arm 131 depending from it and carrying another cam surface 132.

133 is a roll carried by a block 134 adjustably secured to an arm 135 formed on the end of a rocking lever 136, see Fig. 13, pivotally mounted on the shaft 843 by which the hook is operated. The other end of said lever 136 has a pawl-releasing member 137 rising therefrom and provided with a cam surface 812 which is adapted to engage a roll 138 on the locking pawl 115.

In case the reversing mechanism for the feed fails to operate so that the nut 14 continues its movement beyond the normal reversing point one of the cams 130 or 132 will engage the roll 133 and thereby rock the lever 136 thus raising the latch-releasing member 137 and releasing the latch which will allow the stop motion to operate to bring the machine to rest.

The work clamps are constructed so that when they are closed onto the work they will be separated or spread thereby to put the cloth under slight tension while the buttonhole is being sewed. The construction is also such that when the clamps are raised they are automatically closed together slightly so as to provide for the spreading of the clamps when they are closed again.

The shaft 102 carrying the lifting arm 100 has rigid therewith two heads 138 (see Fig. 18) each of which is formed with a cam groove 139 (see Fig. 17). Each clamp arm 700 is provided with a projection 140 entering one of the cam grooves 139. It will be remembered that the clamps are opened by swinging the arm 100 upwardly either by the manual connection 101 or by the arm 99 on the rock shaft 98, the initial upward movement of the arm 100 turning the rock shaft 102 to bring the shoulder 727 against the shoulder 728 and further upward movement of the arm 100 then serving to swing the member 89 of the clamp arms 700 upwardly. During this initial turning movement of the rock shaft 102 by which the shoulders 727 and 728 are brought into engagement the cam grooves 139 act on projections 140 and move the two upper clamps together. When the clamps are released they first move downwardly into contact with the work and after they contact with the work then the spring 141 which is connected to the tail 142 of the arm 100 serves to turn the rock shaft 102 from the position in which the shoulders 728 and 727 are in engagement into the position shown in Fig. 19 and this turning movement operates through the cams 139 to spread the arms 700 slightly and thereby place the cloth under tension.

The driving member 41 also operates to release the tension on the upper thread at the time that the barring stitches b are being formed. This tension is indicated at 143 and is of the usual type comprising two disks spring pressed together. The tension is released by a pin 144 which is adapted to engage one of the disks 143 against which the tension spring rests. This pin 144 is controlled by a cam on the end of a sliding rod 146, the construction being such that when the rod is moved forward the tension is released in a well-known way.

The rod 146 is actuated from a lever 147 (see Fig. 1) having a follower roll 148 resting on a cam face 749 formed on the driving member 41, said lever having a link or thrust member 149 connected thereto which is bent laterally at its forward end and is provided with an opening through which the rod 146 extends. This rod has a collar 150 thereon with which the bent end of the link 149 engages. The cam face 749 on the driving member 41 is formed with two low portions 151 on one of which the follower roll rests when the driving member is stationary and during the formation of the edge stitches on the buttonhole. Said cam face is also provided with two high portions between the low portions and when the barring stitches at each end of the buttonhole are being formed and the member 41 is making a half rotation one of these high portions passes under the follower roll thus rocking the lever sufficiently to release the tension slightly on the needle thread. This will allow the needle thread to draw freely through the tension thus bringing the tension on the upper and under thread more nearly equal so that the thread will lock in the goods.

I have above described the mechanism for forming the side stitches s and the barring stitches b of the buttonhole which mechanism includes means for feeding the work during the formation of the side stitches s and for vibrating the work clamps during the formation of the barring stitches and also means for reversing the feed movement, throwing the barring cam into and out of operation, and releasing the tension on the upper thread during the formation of the barring stitches. The mechanism for performing these functions is operated from the cam mechanism carried by the stud 28 and actuated by the power shaft 8 when the latter is clutched to the driving pulley.

In addition to the above operations there are certain other operations which are performed by a buttonhole sewing machine such as cutting the buttonhole slit, pulling off a length of upper and under thread at the end of the sewing operation, trimming both threads, holding the end of the needle thread and opening the clamps. These operations are in the present invention performed by a cam device which is normally inoperative while the stitching on the buttonhole is being performed but which is rendered operative automatically by the action of the stop motion in bringing the machine to rest.

This cam is indicated at 158, (see Figs. 2 and 9) and it is adapted to be clutched to a constantly-driving member 159 by means of a clutch pin 160 similar to that shown in co-pending application of John Kiewicz, Serial No. 75,518, filed December 15th, 1925. While the sewing operation is in progress the clutching pin 160 is withdrawn and is held withdrawn by the clutch dog 161. When the stop motion operates to bring the stitch-forming mechanism to rest the clutch dog 161 is released from the clutch pin and the latter is thrown into clutching engagement with the constantly-rotating member 159 by means of the spring 162 thereby clutching the cam to the constantly-rotating member. This constantly-rotating member 159 is shown as in the form of a gear which is geared to a pinion 163 that is rigid with the clutch pulley.

In order to thus actuate the clutch dog from the stop motion said dog is shown as mounted on a rock shaft 164 which has an arm 165 rigid therewith carrying a projection 166 that is situated to be engaged by an arm 167 that is rigid with the stop motion block. When the machine is brought to rest and the stop dog is engaged by the stop cam the arm 167 will be given a slight rocking or forward movement (see dotted lines Fig. 10) which will operate through the arm 165 to rock the shaft 164 sufficiently to release the clutch dog from engagement with the clutch pin. The cam 158 is then clutched to the rotating member 159.

This clutch is in the form of a one-revolution clutch and after one rotation the clutch pin is withdrawn from clutching engagement by the clutch dog so the cam will make only one rotation all as in the device of said Kiewicz application.

Co-operating with the cam 158 are two levers 169, 170. The lever 169 operates to lift the clamps when the sewing operation is completed. The lever 170 operates to actuate the buttonhole cutter and the thread trimmers. The lever 169 is mounted on the rock shaft 107 which is provided with an arm 172 (see Figs. 2 and 9) that is pivotally connected to the latch 105. When the cam 158 is at rest during the sewing operation the lever arm 169 is resting on the high part of the cam (see Fig. 2) and when the cam 158 is started in operation by the stop motion and the high part of the cam passes out from under the lever 169 said lever will move downwardly by the action of the spring 173 which keeps the roll 109 on the follower arm 169 in contact with the cam. This movement of the rock shaft will move the latch 105 forwardly from the position shown in Fig. 30 to that shown in Fig. 2. Fig. 30 illustrates the position of the parts during the stitching operation with the clamps closed. When the latch 105 is moved forwardly by the rotation of the cam 158, as above described, said latch will drop over the projection 104 as shown by dotted lines Fig. 30. As the cam 158 completes its rotation the high part of the cam passes under the follower arm 169 thus swinging it into the position shown in Fig. 2 and thereby turning the rock shaft 107 and moving the arm 172 to the right which will bring the parts into the position shown in Fig. 2. This backward movement of the latch 105 co-operates with the projection 104 to swing the arm 103 backwardly thus raising the arm 99 with the result that the clamp will be opened as above described.

Just prior to the opening of the clamps but after the stitch-forming mechanism has come to rest the buttonhole slit is cut.

The cutting of the buttonhole is accomplished by a buttonhole cutter 174 which is carried by a sliding shank 175 slidable in a guide 176. The upper end of the shank is provided with a slot, see Fig. 1, in which operates the rounded head of an elbow lever 177 pivoted at 178. This elbow lever 177 is pivotally connected by a link 179 with the upper end of a lever 180 which is fast on a rock shaft 181 that carries the follower arm 170 which is held in engagement with the cam 158 by the spring 739. The lever 180 is acted on by a spring 182 which normally holds the cutter raised and co-operates with the spring 739 to hold the follower arm 170 in engagement with the cam 158. The cam 158 is so shaped that as it starts to rotate it actuates the follower arm 170 thereby rocking the shaft 181, this rocking movement operating through the connections above described to give the buttonhole cutter 174 its cutting movement.

As stated above the machine also includes means for trimming the needle thread at the end of the stitching operation and holding the trimmed end. The thread-trimming mechanism is of that type which operates to trim or cut the thread at the end of the seam and to hold the cut end leading to the needle until after the stitching has begun on the next buttonhole and then to again cut or trim the held end of the thread. The cutter thus operates twice, once at the end of the seam and once after the beginning of the next seam. Furthermore, the cutting of the thread at the end of the seam and the operation of the thread holder for holding the thread is power actuated from the cam 158 and the second cutting of the thread at the beginning of the seam is accomplished by the action of a spring.

The thread holder which grips the needle thread at the end of the seam is in the form of a hook 183, (see Figs. 16 and 17) which co-operates with a thread-clamping plate 184 that is carried by one of the upper work clamps. This hook 183 is carried by an arm 185 pivoted at 186 and it has pivotally connected thereto a rearwardly-extending arm 187 that is pivoted to the upper end of an elbow lever 188, the latter being pivoted at 943.

This elbow lever 188 is provided with a tooth 209 which is adapted to be engaged by a spring-pressed latch 193 pivoted on the pivotal shaft 90, said latch holding the arm 185 in its retracted position shown in Fig. 17 against the action of the spring 192. Before the stitching on the buttonhole is completed the latch 193 is released thus allowing the spring 192 to move the thread-holding member into the dotted line position Fig. 35 or into the full line position Fig. 36, in which position the point of the hook has wiped by the needle thread. After the stitch-forming mechanism has come to rest then the thread-holding hook is returned to the position shown in Fig. 17 and full line position Fig. 35 and in its return movement it seizes the needle thread and pulls it and clamps it against the clamping plate 184.

The means for accomplishing this is as follows: The release of the latch 193 is accomplished during the feeding movement of the work holder and by means of a cam 195 carried by the bed plate with which the tail 194 of the latch 193 engages during the feeding movement of the work clamps. As the tail 194 is carried up over the cam 195 the latch will be depressed out of engagement with the tooth 209 as will be obvious.

The means for giving the thread-holding hook its thread-gripping movement will be presently described.

The upper thread trimmer comprises a blade 201 having two cutting edges 202, 203. This cutting blade is carried by a shank 204 which is secured to the end of an arm 205 also pivoted at 186, said arm being acted on by a spring 206 which tends normally to hold the cutter in the position shown in Fig. 35, which is the position it occupies during the sewing of the major part of the buttonhole including the last part thereof. After the sewing operations have been completed and the stitch-forming mechanism has come to rest and after the thread holder has been given its movement from the dotted to the full line position Fig. 35 thereby to clamp the needle thread against the clamp plate 184 the cutter 201 is given a movement from the position shown in Fig. 35 to that shown in Fig. 17, during which movement the cutting edge 202 will sever the needle thread between the holding means and the work. When the cutter has been thus moved into the position shown in Fig. 17 it is held in this position by the latch 193 and for this purpose the arm 205 has pivotally connected thereto a connection 207 which in turn is pivotally connected to a rocking member 208 mounted to rock on the pivot 943 and provided with a tooth 509. As the arm 205 swings into the position shown in Fig. 17 the member 208 moves forwardly so that the tooth 509 will be caught by the latch 193 and the latch will hold the cutter in this position until the sewing on the next buttonhole begins, at which time the latch is released by engagement of the tail 194 with the cam 195 as above described. When the latch is released the spring 206 will return the cutter to the position shown in Fig. 35 and during this movement the cutting edge 203 will cut the end of the thread at the beginning of the seam which is held by the holder 183.

The tooth 509 is slightly shorter than the tooth 209 and as the latch is turned by the cam 195 the tooth 509 will first be released thus permitting the spring 206 to return the cutter to the position shown in Fig. 35 thereby severing the held end of the thread after which the tooth 209 will be released to allow the thread-holding hook to move into the dotted line position Fig. 35 by the action of the spring 192.

The means for thus operating the thread-holding hook and the trimmer are as follows:

191 indicates a rocking member pivoted on the shaft 743 and carrying a roll 190 adapted to engage the cam end 189 of the elbow lever 188 as the rocking member swings to the left. Such swinging movement of the member 191 is derived from the cam 158.

The swinging member 191 carries a stud 747 on which is mounted a roll 197 that cooperates with a cam 198 slidably mounted on the bed. This cam 198 is connected by a connection 199 with the lower end of a lever 200 which is fast on the rock shaft 181 and, therefore, as the rock shaft 181 is turned by the cam 158, which, it will be remembered, makes one complete rotation at the end of the stitching operation, the arm 200 and the cam member 198 will be moved forwardly to the left Figs. 2, 16 and 31 and the cam member 198 will act against the roll 197 thereby swinging the member 191 and causing the roll 190 to act on the cam face 189 and to depress the horizontal arm of the elbow lever 188, as seen in Fig. 33, thus swinging the arm 185 and moving the thread-holding hook from the dotted to the full line position Fig. 35. As the elbow lever 188 is thus given its turning movement the latch 193 will automatically engage the tooth 209 and lock it in position.

For actuating the cutter I have provided a pusher member 210 rigid with the swinging member 191 and it engages the end of the rocking member 208 when the member 191 is swung forwardly by the cam 198. The forward swinging movement of the member 208 about its pivot 943 will operate through the connection 207 to swing the arm 205 and carry the knife from the position shown in Fig. 35 to that shown in Fig. 17. As the member 208 is swung forwardly it also is latched in its position by the latch 193 and thus when the cam 158 completes its rotation the thread-holding hook and the cutter are both latched in the position shown in Figs. 16 and 17 by the latch 193.

It will thus be seen that when the machine is at rest after the completion of the sewing operation and after the completion of the thread-cutting operation the thread cutter and the thread holder are in the position shown in Fig. 17, being held in this position by the latch 193 and the needle thread is engaged by the thread holder.

When the machine has started and as the sewing proceeds down the side of the buttonhole the tail of the latch 194 engages the cam 195 thus releasing the latch from the teeth 209 and 509, and since the tooth 509 is shorter than the tooth 209 the cutter will be first released and will swing into the position shown in Fig. 35 by the action of the spring 206 thus cutting the held end of the thread and immediately after this the tooth 209 will be released and the thread holder will swing into the position shown in dotted lines Fig. 35. The cutter and holder remain in this position during the completion of the buttonhole and after the stitch-forming mechanism has been brought to rest then the cam 158 is given a rotation which operates as above described to first move the thread holder from the dotted to the full line position Fig. 35 thereby seizing and gripping the needle thread after which the thread cutter is moved into the position shown in Fig. 17 thus severing the needle thread.

It will thus be seen that the operation of seizing and holding the thread and of cutting the thread at the end of the seam is accomplished by power mechanism while the second cutting at the beginning of the seam is accomplished by the action of a spring. Furthermore, with this invention the cutter has only one complete reciprocation for both cutting operations, a movement in one direction causing the cutting edge 202 to cut the thread at the end of the seam and movement in the other direction causing the cutting edge 203 to cut the thread at the beginning of the seam.

The machine herein shown is also provided with means for pulling off a length of under thread at the end of each sewing operation and then cutting the under thread close to and beneath the work. This under thread pull-off and cutter is also actuated from the rock shaft 181. The under thread pull-off is in the form of a resilient arm 212, see Fig. 21, which is carried by a rocking member 213 pivoted at 214 to the bed frame. This rocking member has a fork 215 which embraces a stud 216 carried by a slide 217. This slide 217 is connected at its rear end to one arm of a rocking member 218 pivoted in a boss 219, the other arm of said member having a pin-and-slot connection with the arm 200 on the rock shaft 181. When the rock shaft 181 is turned to force the cam 198 forwardly as above described thereby to actuate the upper thread cutter and holder the rocking member 218 will be turned about its pivot thereby pulling the slide 217 to the rear thereby swinging the member 213 and pulling off a length of under thread. This slide also actuates the under thread cutter.

Said cutter is shown at 220, Fig. 20, and it is pivotally connected to a sliding block 221 sliding in a guideway 222 formed in the bed. This cutter 220 is provided with a depending pin or stud 422 which extends through a cam slot 223 so that when the sliding block 221 is moved backwardly the under thread cutter will be given a sidewise swinging movement thus giving it a shearing cut. The cutting edge 225 of the cutter passes through a transverse slot in the throat plate. The sliding block 221 passes through a slot in the bed plate and has a depending stud 228 received between two arms 229 on a plate 230 that is adjustably secured to the end of the slide 217.

The two arms 229 are spaced apart to allow some lost motion and as a result during the initial movement of the slide the pull-off is actuated to pull off a length of thread and when this has performed its function one of the arms 229 engages the stud 228 and moves the slide 221 thus actuating the under thread cutter. The slide 217 is acted on by a spring 232 which keeps it in its normal position.

Figure 2:
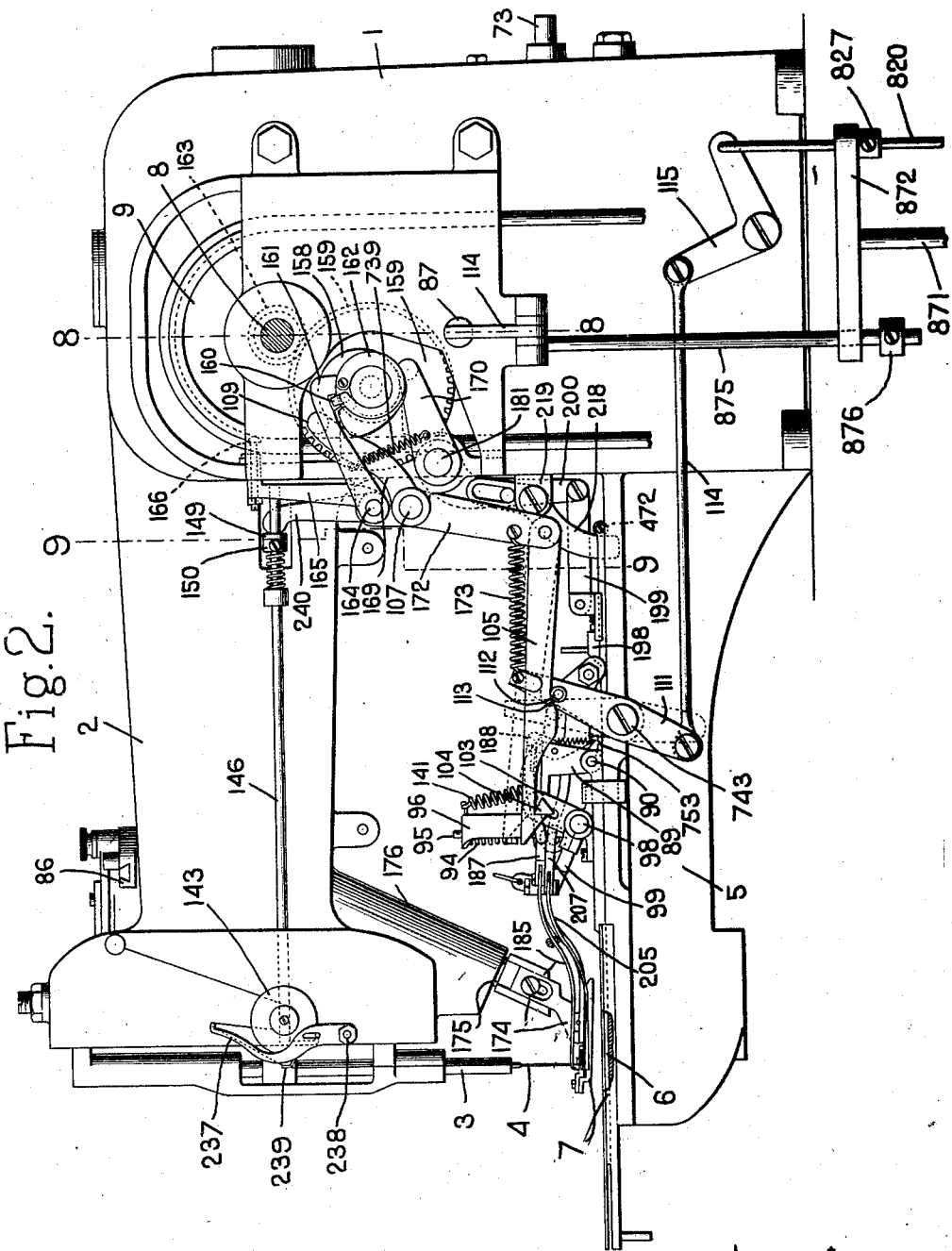
Fig. 2 is a side view looking from the opposite side.

237 is a pull-off arm for pulling off a length of upper thread, see Fig. 2. This arm is pivoted to the head at 238 and is connected to the offset end 239 of the sliding rod 146. The rock shaft 164 has an arm 240 rigid therewith which engages the bent end 149 of the link through which the tension-releasing rod extends so that when the clutch dog 160 is operated to release the clutch the pull-off arm 237 is actuated to pull off a length of upper thread.

A cam 243 is also provided for operating the pull off, the purpose of the cam being to ensure that the same amount of upper thread will be pulled off at the end of each buttonhole. This cam 243 is carried by the driving member 41 and is adapted to engage the roll 148 on the end of the lever 147, which it will be remembered, is connected to the link or thrust member 149, the end of the latter being bent laterally and provided with an opening through which the rod 146 extends, this bent end resting against the collar 150 which is fast on the sliding rod 146. Hence as the cam wipes under the roll 148 the rod 146 will be actuated thereby operating the pull off 237. The operation of the cam renders the action of the pull off certain and ensures that said pull-off arm will always be moved to the same extent each time thus pulling off the same amount of thread at the end of each buttonhole. This will obviate the possibility of loose stitches at the start due to pulling off too much thread and also the tendency of the stitches to break if too small an amount of thread is pulled off.

I have also provided herein a safety device which will prevent the operation of the thread trimmers while the stitch-forming mechanism is in operation. This safety device is in the form of a latch 247 pivoted at 248 and adapted to engage over the end of the projection 166. Said arm is acted on by a spring 249 tending to hold it in its operative position.

When the stop motion is operated to stop the machine a lug 250 on the arm 167 engages a projection 381 on this safety member 247 and thrusts it out of engagement with the projection 166 as shown in Fig. 9. When the machine is started in operation and the stop motion block is moved to the left the safety member 247 is released and automatically swings into locking engagement with the projection 166 thus locking the rock shaft 164 from turning movement and preventing any possibility that the clutch pin 160 will be operated to clutch the cam 158 to the driving member and this will prevent the operation of the thread cutters until the stop member is brought into action to bring the machine to rest with the needle in elevated position.

I have provided herein means for operating the buttonhole cutter by hand if desired.

The swinging member 177 has a shaft or stud 178 rigid therewith, said stud projecting through the frame and the projecting end is constructed so that a wrench may be applied thereto for turning the member 177 thereby to lower the knife. This is a special advantage in sewing buttonholes in collars as it assists the operator in setting the gauge for positioning the collar. By thus depressing the buttonhole cutter by hand while the machine is in operation the operator can tell exactly where the buttonhole will be cut and can set the gauge accordingly.

I claim:

1. In a buttonhole sewing machine, the combination with a frame, of work-holding means supported thereby, stitch-forming mechanism, a feed screw to give the work-holding means a feeding movement for forming the stitches along the edge of the buttonhole, a vertically-disposed cam shaft, a barring cam thereon, means operated thereby to form barring stitches, a feed-reversing cam also mounted thereon, means actuated by said cam to reverse the feed screw, and means operated by the feeding movement of the work-holding means to render the barring cam and feed-reversing cam operative at each end of the buttonhole.

2. In a buttonhole sewing machine, the combination with stitch-forming mechanism, of work-holding means, means to give the work-holding means a feeding movement, a cam shaft, a continuously-rotating driving ratchet mounted thereon, a barring cam loosely mounted on said shaft and having a driving pawl, means normally holding the driving pawl out of driving engagement with the driving ratchet, means actuated by the feeding movement of the work-holding means to release the driving pawl at each end of the buttonhole whereby the barring cam is operated to form barring stitches, and means to disconnect the driving pawl from the ratchet after the barring stitches are formed.

3. In a buttonhole sewing machine, the combination with stitch-forming mechanism, of work-holding means, feeding means for the work-holding means, a stationary cam shaft, a continuously-rotating driving ratchet loosely mounted thereon, a stop motion device for bringing the machine to rest, a barring cam member loosely mounted on the cam shaft and having a driving pawl, means actuated by the feeding movement of the work-holding means to connect the driving pawl to the driving ratchet at each end of the buttonhole, whereby barring stitches are formed, and means associated with the barring cam to actuate the stop motion at the end of the buttonhole.

4. In a buttonhole sewing machine, the combination with stitch-forming mechanism, of work-holding means, feeding means for the work-holding means, a stationary cam shaft, a continuously-rotating driving ratchet loosely mounted thereon, a stop motion device for bringing the machine to rest, a barring cam member loosely mounted on the cam shaft and having a driving pawl, means actuated by the feeding movement of the work-holding means to connect the driving pawl to the driving ratchet at each end of the buttonhole, whereby barring stitches are formed, means associated with the barring cam to release the tension on the needle thread during the formation of the barring stitches.

5. In a sewing machine, stitch-forming mechanism, a stop motion device for stopping the machine, a reversible feed for feeding the work, and a safety device operated by the feed in case it fails to reverse or overruns, which safety device actuates the stop motion to bring the machine to rest.

6. In a buttonhole sewing machine, the combination with a needle, of needle-jogging mechanism, work-holding means, means to vibrate the work-holding means to form barring stitches, and adjustable means to give the needle-jogging mechanism a side feed motion during the formation of the barring stitches, whereby the spacing between the side stitches on the buttonhole may be varied.

7. In a buttonhole sewing machine, the combination with stitch-forming mechanism, of a driving device and stop motion for operating the stitch-forming mechanism and bringing it to rest at the end of the seam, means for feeding the work including means to reverse the direction of feed, a latch to hold the driving device operative, means to release the latch at the completion of the buttonhole, and other means to release the latch in case the feed reverse fails to operate.

8. In a buttonhole sewing machine, the combination with stitch-forming mechanism, of work-holding means, feeding means for the work-holding means, a cam shaft, a continuously-rotating driving ratchet mounted thereon, a barring cam loosely mounted on said shaft and having a driving pawl, two stop members normally holding the barring cam from rotation and one of said stop members normally engaging the driving pawl and holding it in inoperative position, means actuated by the feeding movement of the work-holding means to shift said stop members into inoperative position at each end of the buttonhole, whereby both the driving pawl and the barring cam are released, and means to return said stop members to operative position, whereby they bring the barring cam to rest after it has made a half revolution and render the driving pawl inoperative.

9. In a buttonhole sewing machine, the combination with stitch-forming mechanism, of work-holding means, means to give the work-holding means a feeding movement, a cam shaft, a continuously-rotating driving ratchet mounted thereon, a barring cam loosely mounted on said shaft and having a driving pawl, a stop member normally holding the barring cam from rotation and the driving pawl in inoperative position, means actuated by the feeding movement of the work-holding means to shift the stop member into inoperative position whereby the barring cam is released and the driving pawl is rendered operative to rotate the barring cam.

10. In a buttonhole sewing machine, the combination with stitch-forming mechanism, of work-holding means, means to give the work-holding means a feeding movement, a cam shaft, a continuously-rotating driving ratchet mounted thereon, a barring cam loosely mounted on said shaft and having a driving pawl, a stop member normally holding the barring cam from rotation and the driving pawl in inoperative position, means actuated by the feeding movement of the work-holding means to shift the stop member into inoperative position whereby the barring cam is released and the driving pawl is rendered operative to rotate the barring cam, and means to return the stop member to operative position, whereby it will bring the barring cam to rest and disengage the driving pawl from the driving ratchet when the barring stitches are formed.

11. In a buttonhole sewing machine, the combination with stitch-forming mechanism, of work-holding means, means to give the work-holding means a feeding movement, a cam shaft, a continuously-rotating driving ratchet mounted thereon, a barring cam loosely mounted on said shaft and having a driving pawl, two stop members situated on opposite sides of the barring cam and when in normal position holding the barring cam from forward rotary movement, one of said stop members also normally holding the driving pawl inoperative, means actuated by the feeding movement of the work-holding means to shift the stop members into inoperative position, whereby both the barring cam and the driving pawl is released, the driving pawl then co-operating with the driving ratchet to rotate the barring cam, and means to return the stop members to operative position in time to disengage the driving pawl and bring the cam to rest after it has made a half revolution.

12. In a buttonhole sewing machine, the combination with stitch-forming mechanism, of work-holding means, means to give the work-holding means a feeding movement, a cam shaft, a continuously-rotating driving ratchet mounted thereon, a barring cam loosely mounted on said shaft and having a driving pawl and two oppositely disposed projections, a stop member normally engaging one of said projections and the driving pawl thereby holding the driving pawl inoperative and restraining the barring cam from movement, means actuated by the feeding movement of the work-holding means to render said stop member inoperative at the end of the buttonhole, whereby the barring cam is released and the driving pawl is rendered operative, and means to move the stop member into operative position in which it engages the other projection and the driving pawl and renders the latter inoperative and brings the barring cam to rest.

13. In a buttonhole sewing machine, the combination with stitch-forming mechanism, of work clamps, driving and stopping mechanism, including a driving pulley, for operating the stitch-forming mechanism and bringing it to rest, a buttonhole cutter, a rotatable device operating independently of the stitch-forming mechanism, means operated by the stopping mechanism when the stitch-forming mechanism comes to rest to couple the rotatable member to the driving pulley for one complete rotation, and means actuated by said rotatable device during its single complete revolution to cut both the upper and the under thread, actuate the buttonhole cutter, and open the work clamps.

14. In a buttonhole sewing machine, the combination with stitch-forming mechanism, of work clamps, a driving pulley, means for coupling the driving pulley to the stitch-forming mechanism and for disconnecting said pulley from the stitch-forming mechanism when the stitching on the buttonhole is completed, a buttonhole cutter, a rotatable device, means to operatively connect the rotatable device to the driving pulley when the stitch-forming mechanism has been brought to rest, and means actuated by said rotatable device to cut both the upper and under thread, actuate the buttonhole cutter, and open the work clamps.

15. In a buttonhole sewing machine, the combination with stitch-forming mechanism, of work clamps, a driving pulley, means for coupling the driving pulley to the stitch-forming mechanism and for disconnecting said pulley from the stitch-forming mechanism when the stitching on the buttonhole is completed, a buttonhole cutter, a rotatable device, a one-revolution clutch for operatively connecting the rotatable device to the driving pulley when the stitch-forming mechanism comes to rest, and means actuated by said rotatable device during its single complete revolution to cut both the upper and under thread, actuate the buttonhole cutter, and open the work clamps.

In testimony whereof, I have signed my name to this specification.

AXEL FOLKE CARLSON.